United States Patent
Boon et al.

(10) Patent No.: US 10,165,271 B2
(45) Date of Patent: *Dec. 25, 2018

(54) IMAGE PREDICTION ENCODING DEVICE, IMAGE PREDICTION DECODING DEVICE, IMAGE PREDICTION ENCODING METHOD, IMAGE PREDICTION DECODING METHOD, IMAGE PREDICTION ENCODING PROGRAM, AND IMAGE PREDICTION DECODING PROGRAM

(71) Applicant: NTT DOCOMO, INC., Chiyoda-ku (JP)

(72) Inventors: Choong Seng Boon, Yokohama (JP); Thiow Keng Tan, Jalan Sindor (SG)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/825,649

(22) Filed: Nov. 29, 2017

(65) Prior Publication Data

US 2018/0084249 A1 Mar. 22, 2018

Related U.S. Application Data

(63) Continuation of application No. 15/385,358, filed on Dec. 20, 2016, now Pat. No. 9,860,534, which is a (Continued)

(30) Foreign Application Priority Data

Oct. 19, 2005 (JP) ................................ 2005-304534

(51) Int. Cl.
*H04N 19/11* (2014.01)
*H04N 19/50* (2014.01)
(Continued)

(52) U.S. Cl.
CPC ............. *H04N 19/11* (2014.11); *H04N 19/13* (2014.11); *H04N 19/136* (2014.11); (Continued)

(58) Field of Classification Search
CPC ........ H04N 19/11; H04N 19/13; H04N 19/61; H04N 19/136
See application file for complete search history.

(56) References Cited

U.S. PATENT DOCUMENTS 6,148,109 A 11/2000 Boon
9,571,831 B2 * 2/2017 Boon ..................... H04N 19/50
(Continued)

FOREIGN PATENT DOCUMENTS

JP   10 191324    7/1998
JP   2005 151017  6/2005
(Continued)

OTHER PUBLICATIONS

Iain E. G. Richardson, "H.254 and MPEG-4 Video COmpression: Video Coding for Next generation Multimedia", Oct. 17, 2003.*
(Continued)

*Primary Examiner* — Siming Liu
(74) *Attorney, Agent, or Firm* — Oblon, McClelland, Maier & Neustadt, L.L.P.

(57) ABSTRACT

The image predictive encoding device 10 comprises an intra frame predictive signal generation method determination section 15 which determines, for adjacent areas comprising regenerated pixel signals and adjacent to the target area, a predictive method which is derived on the basis of data corresponding to the adjacent areas as an R mode predictive method or an L mode predictive method, an intra frame predictive signal generation section 16 which generates an intra frame predictive signal on the basis of the R mode predictive method thus determined, and a subtractor 18, a
(Continued)

transform section 19, a quantization section 20, and an entropy encoding section 25 which encode a residual signal of a pixel signal of the target area on the basis of the generated intra frame predictive signal.

16 Claims, 14 Drawing Sheets

Related U.S. Application Data continuation of application No. 14/100,740, filed on Dec. 9, 2013, now Pat. No. 9,571,831, which is a continuation of application No. 12/090,715, filed as application No. PCT/JP2006/320766 on Oct. 18, 2006, now abandoned.

(51) Int. Cl.
| | | |
|---|---|---|
| *H04N 19/176* | (2014.01) | |
| *H04N 19/46* | (2014.01) | |
| *H04N 19/61* | (2014.01) | |
| *H04N 19/593* | (2014.01) | |
| *H04N 19/136* | (2014.01) | |
| *H04N 19/14* | (2014.01) | |
| *H04N 19/157* | (2014.01) | |
| *H04N 19/13* | (2014.01) | |
| *H04N 19/172* | (2014.01) | |
| *H04N 19/182* | (2014.01) | |

(52) U.S. Cl.
CPC .......... *H04N 19/14* (2014.11); *H04N 19/157* (2014.11); *H04N 19/176* (2014.11); *H04N 19/46* (2014.11); *H04N 19/50* (2014.11); *H04N 19/593* (2014.11); *H04N 19/61* (2014.11); *H04N 19/172* (2014.11); *H04N 19/182* (2014.11)

(56) References Cited

U.S. PATENT DOCUMENTS

| | | |
|---|---|---|
| 2001/0022855 A1 | 9/2001 | Matsumoto |
| 2005/0013376 A1 | 1/2005 | Dattani et al. |
| 2005/0117646 A1 | 6/2005 | Joch et al. |
| 2005/0157797 A1 | 7/2005 | Gaedke |
| 2005/0201627 A1 | 9/2005 | Liang et al. |
| 2006/0104354 A1* | 5/2006 | Han .................... H04N 19/159 375/240.03 |
| 2006/0176962 A1 | 8/2006 | Arimura et al. |

FOREIGN PATENT DOCUMENTS

| | | |
|---|---|---|
| JP | 2005 184241 | 7/2005 |
| JP | 2005-184857 A | 7/2005 |
| RU | 2 162 280 C2 | 1/2001 |
| SU | 1730724 A1 | 4/1992 |
| WO | WO 01/86962 A1 | 11/2001 |
| WO | WO 02/054779 A2 | 7/2002 |

OTHER PUBLICATIONS

Iain E.G. Richardson, "H.264 and MPEG-4 Video Compression: Video Coding for Next generation Multimedia", Oct. 17, 2003.
Office Action dated Mar. 8, 2016 in Korean Patent Application No. 10-2015-7037146 (with English language translation).
Office Action dated Sep. 25, 2015 in Korean Patent Application No. 10-2014-7026365 (with English translation).
Office Action dated Feb. 14, 2014 in European Application No. 12 195 633 8-1907, 7 pages.
Office Action dated Nov. 7, 2013 in Chinese Patent Application No. 200680038932.9 (with English language translation).
Office Action dated Oct. 2, 2013 in Korean Patent Application No. 10-2013-70271134 (with English language translation).
Notice of Preliminary Rejection dated Jan. 15, 2015 in Korean Patent Application No. 10-2014-7026365 with English translation).
Office Action dated Jan. 27, 2014 in Indian Patent Application No. 3708/DELNP/2008.
Extended European Search Report dated Apr. 26, 2011, in Patent Application No. 06821945.0.
"Chapter 6: H.264/MPEG4 Part 10", Iain E. G. Richardson, H.264 and MPEG-4 Video Compression: Video Coding for Next-Generation Multimedia, John Wiley & Sons, XP30001626, Oct. 17, 2003, pp. 159-223.
Zhong Xue, et al., "An Automatic Mode Decision Method for Intra Frame Coding and Decoding", ITU Study Group 16-Video Coding Experts Group—ISO/IEC MPEG & ITU-T VCEG (ISO/IEC JTC1/SC29/WG11 and ITU-T SG16 Q6), No. M7719, XP 30036810, Nov. 26, 2001, 9 pages.
Iain Richardson, "H.264 and MPEG-4 Video Compression. Video Coding for Next Generation", Technosfera Publishing House, 2005, pp. 145-183 (with English translation).
Office Action dated Jan. 13, 2011, in Chinese Patent Application No. 200680038932.9 with English translation.
"H.264/MPEG4 Part 10, video compression", Iain E. G. Richardson, Wiley, pp. 176-183, (2003).
Extended European Search Report dated May 7, 2012, in Patent Application No. 11188588.5.
Korean Office Action dated Nov. 1, 2012 in Korean Application No. 10-2012-7017398 with English translation.
Office Action dated Jul. 9, 2013 in Japanese Patent Application No. 2011-203780 with English language translation.
Extended European Search Report dated May 29, 2013 in Patent Application No. 12195633.8.
Office Action dated Mar. 19, 2013 in the corresponding Chinese Patent Application No. 200680038932.9 (with English translation).
Iain E.G. Richardson, "H.264 and MPEG-4 Video Compression: Video Coding for Next generation Multimedia" Oct. 17, 2003, pp. 159-223.
Korean Office Action dated Jan. 5, 2012, in Patent Application No. 10-2009-7026988 (with English-language translation).
Office Action dated Jul. 29, 2011, in Chinese Patent Application No. 200680038932.9 with English translation.
Office Action dated May 22, 2014, in Korean Patent Application No. 10-2013-7021134 with English translation.
Office Action dated Jul. 26, 2011, in Japanese Patent Application No. 2005-304534 (with English translation).
Office Action dated Mar. 7, 2017 in Korean Patent Application No. 10-2017-7004371 with English translation.
Combined Office Action and Search Report dated Mar. 24, 2017 in Chinese patent application No. 201410044169.7 (with English translation).
Office Action dated Jul. 24, 2017 in Korean Patent Application No. 10-2017-7015051 (with English translation).
Korean Office Action dated Sep. 21, 2017 in Korean Application No. 10-2014-7026365 (with English translation) 16 pages.
Combined Office Action and Search Report dated Jul. 19, 2017 in Chinese Patent Application No. 201410044169.7 with English translation.
Office Action dated Feb. 9, 2018 in European Patent Application No. 12195633.8.
Office Action dated Dec. 6, 2017 in Chinese Patent Application No. 201410044169.7 (with English translation).
Korean Office Action dated Feb. 21, 2018 in Patent Application No. 10-2017-7036289 (with English translation).
Office Action issued in corresponding European Application No. 12 195 633.8 dated Jul. 24, 2018.
Office Action dated Jun. 5, 2018 in Chinese Patent Application No. 201410044169.7.
Office Action dated Aug. 14, 2018 in European Patent Application No. 12195633.8.

* cited by examiner (a)

(b)

IMAGE PREDICTION ENCODING DEVICE, IMAGE PREDICTION DECODING DEVICE, IMAGE PREDICTION ENCODING METHOD, IMAGE PREDICTION DECODING METHOD, IMAGE PREDICTION ENCODING PROGRAM, AND IMAGE PREDICTION DECODING PROGRAM

CROSS-REFERENCE TO RELATED APPLICATIONS

This application is a continuation of U.S. application Ser. No. 15/385,358, filed Dec. 20, 2016, which is a continuation of U.S. application Ser. No. 14/100,740, filed on Dec. 9, 2013, (now U.S. Pat. No. 9,571,831), which is a continuation of U.S. application Ser. No. 12/090,715 (now abandoned), filed on Aug. 6, 2008, which is a National Stage of PCT/JP2006/320766, filed on Oct. 18, 2006, and claims the benefit of priority under 35 U.S.C. § 119 of Japanese Application No. 2005-304534, filed on Oct. 19, 2005. The entire contents of each of the above are incorporated herein by reference.

TECHNICAL FIELD

The present invention relates to an image prediction encoding device, an image prediction decoding device, an image prediction encoding method, an image prediction decoding method, an image prediction encoding program, and an image prediction decoding program.

BACKGROUND ART

Compression is conventionally carried out by using compression encoding technology to compress image data in order to efficiently transmit and store still image data and moving image data and so forth. The MPEG1 to MPEG4 and H.261 to H.264 systems and so forth are widely used as such compression encoding technology for moving images.

With such encoding systems, encoding processing and decoding processing are carried out after dividing image data constituting the encoding target into a plurality of blocks. Furthermore, in the case of the MPEG4 and H.264 systems, when encoding a target block of an intra frame in order to further raise the encoding efficiency, a predictive signal is generated by using regenerated pixel signals which are adjacent to the target block on the same frame. The regenerated pixel signals are the pixel signals that have been reconstructed from previously compressed pixel data. Furthermore, a differential signal which is obtained by subtracting the predictive signal from the pixel signal of the target block is encoded.

Here, in MPEG4, the pixel signal of the target block is subjected to predictive encoding after performing a discrete cosine transform on the pixel signal of the target block. In other words, for the DC component coefficient of the target block and the AC component coefficient of the first row or first column of the target block, a coefficient for the corresponding component of the block above or to the left of the target block is taken as the predictive value and the difference between the both values is encoded. The determination of the predictive values is carried out on the basis of the size of the gradient of the DC components of a block diagonally above the target block and a block above the target block or to the left thereof. Such an intra frame predictive method appears in Patent Document 1 below.

However, with H.264, a method of generating a predictive signal by extrapolating regenerated pixel values which are adjacent to the target block in a predetermined direction is adopted. The generation of an intra frame predictive signal in this pixel domain has the advantage of making it possible to predict the details in the image. (a) of FIG. 14 shows a schematic diagram serving to illustrate the intra frame predictive method used by H.264 and (b) of FIG. 14 shows the direction for extending the pixel signal of the intra frame predictive method of H.264. In (a) of FIG. 14, block 901 is the target block and blocks 902 to 904 are adjacent blocks, where these blocks contain pixel signals which have been regenerated in previous processing. Here, a regenerated pixel group 905 which is adjacent to the target block boundary of block 901 is used to generate a predictive signal in the nine directions which are shown in (b) of FIG. 14. For example, in the case of direction "0", a predictive signal is generated by extending the adjacent pixel directly above block 901 downward; in the case of direction "1", a predictive signal is generated by extending the regenerated pixel to the left of block 901 to the right and, in the case of direction "2", the average value of all of the pixel values of the pixel group 905 is generated as a predictive signal. A more specific method when generating a predictive signal appears in Non-Patent Document 1 hereinbelow, for example. With H.264, the difference between each of nine predictive signals generated in this manner and a pixel signal for the target block is taken and the predictive signal generation method with the smallest difference value is taken as the optimum predictive method (also referred to as a 'mode').

When transmitting image data, it is necessary to transmit identification information which indicates the optimum predictive method determined in this manner for the recovery of image data to the transmission side. Here, the predictive method determined for the two blocks, namely block 902 and block 903, is taken as the reference and information relating to the optimum predictive method of block 901 is encoded. In other words, the identification information for the method of predicting block 902 and the identification information for the method of predicting block 903 are compared and the identification information with the smallest value is determined as the reference mode information. Further, the identification information relating to the optimum method of predicting the target block is encoded relatively from this reference mode information.

Patent Document 1: U.S. Pat. No. 6,148,109
Non-Patent Document 1: Iain E. G. Richardson, "H.264 and MPEG4 video compression", Wiley 2003, pages pp. 177 to 183.

DISCLOSURE OF INVENTION

Problem to Be Solved by the Invention

However, in the case of a method of encoding using intra frame predictive signal generation in a pixel domain as per H.264, although it is possible to provide multiple predictive methods for improving the efficiency of encoding pixel signals, because it is necessary to use long code length information when encoding the mode information for identifying the predictive method in this case, there is an increase in the overall bit amount. In order to solve such a problem, as mentioned earlier, relative encoding with respect to the identification information related to the adjacent block predictive method is carried out. However, as a result of using two adjacent blocks, there is a tendency for the generation of reference mode information at high accuracy with respect to the optimum predictive method (of the target block) to be impossible and it is not possible to adequately suppress the bit amount of the mode information.

In addition, in cases where adjacent blocks are encoded by means of interframe predictive encoding, target block mode information is relatively encoded by referencing to a fixed mode information because the adjacent blocks do not possess intra frame prediction-related mode information. Interframe predictive encoding is a predictive encoding method which uses a predictive signal of minimal error from the reference image to the target block by taking a regenerated image which is restored after being previously encoded as the reference image. In cases where adjacent blocks adopt interframe predictive encoding in this manner, the encoding efficiency of the predictive method-related mode information when subjecting the target block to intra frame predictive encoding drops.

Therefore, the present invention was conceived in view of these problems and an object of the present invention is to provide an image prediction encoding device, an image prediction decoding device, an image prediction encoding method, an image prediction decoding method, an image prediction encoding program, and an image prediction decoding program which enable efficient encoding processing or decoding processing by reducing predictive method-related mode information for generating an intra frame predictive signal in a pixel domain.

Means for Solving the Problem

In order to solve the above problem, the image prediction encoding device of the present invention is an image prediction encoding device which divides an image into a plurality of regions, generates an intra frame predictive signal with respect to a pixel signal contained in a target area which is a processing target among the areas, and encodes a residual signal between the pixel signal of the target area and the intra frame predictive signal, and the image prediction encoding device comprises first predictive method determination means which derives, based on processed data corresponding to adjacent areas comprising regenerated pixel signals and adjacent to the target area, a predictive method which generates an intra frame predictive signal which has a high correlation to the pixel signals of the adjacent areas from among a predetermined plurality of predictive methods for generating the intra frame predictive signal, and determines the predictive method as a first predictive method; predictive signal generation means which generates the intra frame predictive signal on the basis of the first predictive method determined by the first predictive method determination means; and image encoding means which encodes a residual signal of the pixel signal of the target area on the basis of the intra frame predictive signal generated by the predictive signal generation means.

The image prediction encoding method of the present invention is an image prediction encoding method which divides an image into a plurality of areas, generates an intra frame predictive signal with respect to a pixel signal contained in a target area which is a processing target among the areas, and encodes a residual signal between the pixel signal of the target area and the intra frame predictive signal, and the image prediction encoding method comprises a first predictive method determination step in which first predictive method determination means derives, based on processed data corresponding to adjacent areas comprising regenerated pixel signals and adjacent to the target area, a predictive method which generates an intra frame predictive signal which has a high correlation to the pixel signals of the adjacent areas from among a predetermined plurality of predictive methods for generating the intra frame predictive signal, and determines the predictive method as a first predictive method; a predictive signal generation step in which predictive signal generation means generates the intra frame predictive signal on the basis of the first predictive method determined in the first predictive method determination step; and an image encoding step in which image encoding means encodes a residual signal of the pixel signal of the target area on the basis of the intra frame predictive signal generated in the predictive signal generation step.

The image prediction encoding program of the present invention is an image prediction encoding program which divides an image into a plurality of areas, generates an intra frame predictive signal with respect to a pixel signal contained in a target area which is a processing target among the areas, and encodes a residual signal between the pixel signal of the target area and the intra frame predictive signal, and the image prediction encoding program causes a computer to function as first predictive method determination means which derives, based on processed data corresponding to adjacent areas comprising regenerated pixel signals and adjacent to the target area, a predictive method which generates an intra frame predictive signal which has a high correlation to the pixel signals of the adjacent areas from among a predetermined plurality of predictive methods for generating the intra frame predictive signal, and determines the predictive method as a first predictive method; predictive signal generation means which generates the intra frame predictive signal on the basis of the first predictive method determined by the first predictive method determination means; and image encoding means which encodes a residual signal of the pixel signal of the target area on the basis of the intra frame predictive signal generated by the predictive signal generation means.

According to the image prediction encoding device, image prediction encoding method, and image prediction encoding program, a first predictive method for generating, for regenerated adjacent areas which are adjacent to the target area which is the encoding target, a predictive signal which has a high correlation to the pixel signals of the adjacent areas by using data processed in accordance with the adjacent areas is derived, an intra frame predictive signal of the target area is generated on the basis of the predictive method, and a residual signal for the target area is encoded by using the intra frame predictive signal. As a result, because the predictive method for the intra frame predictive signal is derived simply by using processed data corresponding to regenerated adjacent areas, there is no need to transmit mode information identifying the predictive method and the overall encoding efficiency improves.

Alternatively, the image prediction encoding device of the present invention is an image prediction encoding device which divides an image into a plurality of areas, generates an intra frame predictive signal with respect to a pixel signal contained in a target area which is a processing target among the areas, and encodes a residual signal between the pixel signal of the target area and the intra frame predictive signal, and the image prediction encoding device comprises first predictive method determination means which derives, based on processed data corresponding to adjacent areas comprising regenerated pixel signals and adjacent to the target area, a predictive method which generates an intra frame predictive signal which has a high correlation to the pixel signals of the adjacent areas from among a predetermined plurality of predictive methods for generating the intra frame predictive signal, and determines the predictive method as a first predictive method; second predictive method determination means which generates a plurality of predictive signals corresponding to a predetermined plurality of predictive methods for the target area and determines a second predictive method which is suitable for the target area from among the plurality of predictive methods in accordance with a predetermined evaluation standard; predictive signal generation means which generates the intra frame predictive signal on the basis of the second predictive method determined by the second predictive method determination means; mode information encoding means which relatively encodes the second predictive method on the basis of the first predictive method; and image encoding means which encodes a residual signal of the pixel signal of the target area on the basis of the intra frame predictive signal generated by the predictive signal generation means.

Alternatively, the image prediction encoding method of the present invention is an image prediction encoding method which divides an image into a plurality of areas, generates an intra frame predictive signal with respect to a pixel signal contained in a target area which is a processing target among the areas, and encodes a residual signal between the pixel signal of the target area and the intra frame predictive signal, and the image prediction encoding method comprises a first predictive method determination step in which first predictive method determination means derives, based on processed data corresponding to adjacent areas comprising regenerated pixel signals and adjacent to the target area, a predictive method which generates an intra frame predictive signal which has a high correlation to the pixel signals of the adjacent areas from among a predetermined plurality of predictive methods for generating the intra frame predictive signal, and determines the predictive method as a first predictive method; a second predictive method determination step in which second predictive method determination means generates a plurality of predictive signals corresponding to a predetermined plurality of predictive methods for the target area and determines a second predictive method which is suitable for the target area from among the plurality of predictive methods in accordance with a predetermined evaluation standard; a predictive signal generation step in which predictive signal generation means generates the intra frame predictive signal on the basis of the second predictive method determined in the second predictive method determination step; a mode information encoding step in which mode information encoding means relatively encodes the second predictive method on the basis of the first predictive method; and an image encoding step in which image encoding means encodes a residual signal of the pixel signal of the target area on the basis of the intra frame predictive signal generated by the predictive signal generation means.

Alternatively, the image prediction encoding program of the present invention is an image prediction encoding program which divides an image into a plurality of areas, generates an intra frame predictive signal with respect to a pixel signal contained in a target area which is a processing target among the areas, and encodes a residual signal between the pixel signal of the target area and the intra frame predictive signal, and the image prediction encoding program causes a computer to function as first predictive method determination means which derives, based on processed data corresponding to adjacent areas comprising regenerated pixel signals and adjacent to the target area, a predictive method which generates an intra frame predictive signal which has a high correlation to the pixel signals of the adjacent areas from among a predetermined plurality of predictive methods for generating the intra frame predictive signal, and determines the predictive method as a first predictive method; second predictive method determination means which generates a plurality of predictive signals corresponding to a predetermined plurality of predictive methods for the target area and determines a second predictive method which is suitable for the target area from among the plurality of predictive methods in accordance with a predetermined evaluation standard; predictive signal generation means which generates the intra frame predictive signal on the basis of the second predictive method determined by the second predictive method determination means; mode information encoding means which relatively encodes the second predictive method on the basis of the first predictive method; and image encoding means which encodes a residual signal of the pixel signal of the target area on the basis of the intra frame predictive signal generated by the predictive signal generation means.

According to the image prediction encoding device, image prediction encoding method, and image prediction encoding program, a first predictive method for generating, for regenerated adjacent areas which are adjacent to the target area which is the encoding target, a predictive signal which has a high correlation to the pixel signals of the adjacent areas by using data processed in accordance with the adjacent areas is derived, a second predictive method for generating an intra frame predictive signal of the target area is relatively encoded on the basis of the first predictive method, and a residual signal for the target area is encoded by using the intra frame predictive signal. The predictive method which is derived for the adjacent areas by using processed data corresponding to the regenerated adjacent areas have a high probability of being close to the optimum predictive method for the target area. Hence, by encoding the predictive method-related mode information of the target area relatively by using this predictive method, the bit amount for encoding of the mode information identifying the predictive method is reduced and the overall encoding efficiency improves.

Furthermore, the first predictive method determination means preferably generates a plurality of predictive signals for the adjacent areas corresponding to a predetermined plurality of predictive methods and determines the first predictive method from among the plurality of predictive methods in accordance with a predetermined evaluation standard. In this case, a predictive method which is close to the optimum predictive method for the target area can be easily specified on the basis of a regenerated pixel signal by determining the first predictive method for the adjacent areas from among the plurality of predictive methods in accordance with a predetermined evaluation standard.

In addition, the first predictive method determination means preferably uses three or more predictive methods which are previously determined according to the adjacent areas to determine the first predictive method for the adjacent areas in accordance with a predetermined evaluation standard. If such a constitution is adopted, a predictive method which is close to the optimum predictive method for the target area can be easily specified by using the three or more predictive methods determined for the adjacent areas to determine the first predictive method in accordance with a predetermined evaluation standard.

The image prediction decoding device of the present invention is an image prediction decoding device which divides an image into a plurality of areas, generates an intra frame predictive signal with respect to a pixel signal contained in a target area which is a processing target among the areas, and restores the pixel signal of the target area by combining a residual signal relating to the target area contained in compressed image data and the intra frame predictive signal, and the image prediction decoding device comprises first predictive method determination means which derives, based on processed data corresponding to adjacent areas comprising regenerated pixel signals and adjacent to the target area, a predictive method which generates an intra frame predictive signal which has a high correlation to the pixel signals of the adjacent areas from among a predetermined plurality of predictive methods for generating the intra frame predictive signal, and determines the predictive method as a first predictive method; predictive signal generation means which generates the intra frame predictive signal on the basis of the first predictive method determined by the first predictive method determination means; restoration means which extracts a residual signal relating to the target area from the compressed image data to restore a regenerated residual signal; and image restoration means which restores the pixel signal of the target area by combining the intra frame predictive signal and the regenerated residual signal restored by the restoration means.

The image prediction decoding method of the present invention is an image prediction decoding method which divides an image into a plurality of areas, generates an intra frame predictive signal with respect to a pixel signal contained in a target area which is a processing target among the areas, and restores the pixel signal of the target area by combining a residual signal relating to the target area contained in compressed image data and the intra frame predictive signal, and the image prediction decoding method comprises a first predictive method determination step in which first predictive method determination means derives, based on processed data corresponding to adjacent areas comprising regenerated pixel signals and adjacent to the target area, a predictive method which generates an intra frame predictive signal which has a high correlation to the pixel signals of the adjacent areas from among a predetermined plurality of predictive methods for generating the intra frame predictive signal, and determines the predictive method as a first predictive method; a predictive signal generation step in which predictive signal generation means generates the intra frame predictive signal on the basis of the first predictive method determined in the first predictive method determination step; a restoration step in which restoration means extracts a residual signal relating to the target area from the compressed image data to restore a regenerated residual signal; and an image restoration step in which image restoration means restores the pixel signal of the target area by combining the intra frame predictive signal and the regenerated residual signal restored in the restoration step.

The image prediction decoding program of the present invention is an image prediction decoding program which divides an image into a plurality of areas, generates an intra frame predictive signal with respect to a pixel signal contained in a target area which is a processing target among the areas, and restores the pixel signal of the target area by combining a residual signal relating to the target area contained in compressed image data and the intra frame predictive signal, and the image prediction decoding program causes a computer to function as first predictive method determination means which derives, based on processed data corresponding to adjacent areas comprising regenerated pixel signals and adjacent to the target area, a predictive method which generates an intra frame predictive signal which has a high correlation to the pixel signals of the adjacent areas from among a predetermined plurality of predictive methods for generating the intra frame predictive signal, and determines the predictive method as a first predictive method; predictive signal generation means which generates the intra frame predictive signal on the basis of the first predictive method determined by the first predictive method determination means; restoration means which extracts a residual signal relating to the target area from the compressed image data to restore a regenerated residual signal; and image restoration means which restores the pixel signal of the target area by combining the intra frame predictive signal and the regenerated residual signal restored by the restoration means.

According to the image prediction decoding device, image prediction decoding method, and image prediction decoding program, a first predictive method for generating, for regenerated adjacent areas which are adjacent to the target area which is the decoding target, a predictive signal which has a high correlation to the pixel signals of the adjacent areas by using data processed in accordance with the adjacent areas is derived, an intra frame predictive signal of the target area is generated on the basis of the predictive method, and a pixel signal for the target area is restored from a regenerated residual signal obtained by restoring the residual signal of the target area by using the intra frame predictive signal. As a result, because the predictive method for the intra frame predictive signal is derived simply by using processed data corresponding to regenerated adjacent areas, there is no need to transmit mode information identifying the predictive method and the overall encoding efficiency improves.

Alternatively, the image prediction decoding device of the present invention is an image prediction decoding device which divides an image into a plurality of areas, generates an intra frame predictive signal with respect to a pixel signal contained in a target area which is a processing target among the areas, and restores the pixel signal of the target area by combining a residual signal relating to the target area contained in compressed image data and the intra frame predictive signal, and the image prediction decoding device comprises first predictive method determination means which derives, based on processed data corresponding to adjacent areas comprising regenerated pixel signals and adjacent to the target area, a predictive method which generates an intra frame predictive signal which has a high correlation to the pixel signals of the adjacent areas from among a predetermined plurality of predictive methods for generating the intra frame predictive signal, and determines the predictive method as a first predictive method; predictive method deriving means which extracts a relative predictive method which is relative information identifying the predictive method relating to the target area from the compressed image data and derives a second predictive method for the target area on the basis of the first predictive method and the relative predictive method; predictive signal generation means which generates the intra frame predictive signal on the basis of the second predictive method derived by the predictive method deriving means; restoration means which extracts a residual signal relating to the target area from the compressed image data to restore a regenerated residual signal; and image restoration means which restores the pixel signal of the target area by combining the intra frame predictive signal and the regenerated residual signal restored by the restoration means.

Alternatively, the image prediction decoding method of the present invention is an image prediction decoding method which divides an image into a plurality of areas, generates an intra frame predictive signal with respect to a pixel signal contained in a target area which is a processing target among the areas, and restores the pixel signal of the target area by combining a residual signal relating to the target area contained in compressed image data and the intra frame predictive signal, and the image prediction decoding method comprises a first predictive method determination step in which first predictive method determination means derives, based on processed data corresponding to adjacent areas comprising regenerated pixel signals and adjacent to the target area, a predictive method which generates an intra frame predictive signal which has a high correlation to the pixel signals of the adjacent areas from among a predetermined plurality of predictive methods for generating the intra frame predictive signal, and determines the predictive method as a first predictive method; a predictive method deriving step in which predictive method deriving means extracts a relative predictive method which is relative information identifying the predictive method relating to the target area from the compressed image data and derives a second predictive method for the target area on the basis of the first predictive method and the relative predictive method; a predictive signal generation step in which predictive signal generation means generates the intra frame predictive signal on the basis of the second predictive method derived in the predictive method deriving step; a restoration step in which restoration means extracts a residual signal relating to the target area from the compressed image data to restore a regenerated residual signal; and an image restoration step in which image restoration means restores the pixel signal of the target area by combining the intra frame predictive signal and the regenerated residual signal restored by the restoration means.

Alternatively, the image prediction decoding program of the present invention is an image prediction decoding program which divides an image into a plurality of areas, generates an intra frame predictive signal with respect to a pixel signal contained in a target area which is a processing target among the areas, and restores the pixel signal of the target area by combining a residual signal relating to the target area contained in compressed image data and the intra frame predictive signal, and the image prediction decoding program causes a computer to function as first predictive method determination means which derives, based on processed data corresponding to adjacent areas comprising regenerated pixel signals and adjacent to the target area, a predictive method which generates an intra frame predictive signal which has a high correlation to the pixel signals of the adjacent areas from among a predetermined plurality of predictive methods for generating the intra frame predictive signal, and determines the predictive method as a first predictive method; predictive method deriving means which extracts a relative predictive method which is relative information identifying the predictive method relating to the target area from the compressed image data and derives a second predictive method for the target area on the basis of the first predictive method and the relative predictive method; predictive signal generation means which generates the intra frame predictive signal on the basis of the second predictive method derived by the predictive method deriving means; restoration means which extracts a residual signal relating to the target area from the compressed image data to restore a regenerated residual signal; and image restoration means which restores the pixel signal of the target area by combining the intra frame predictive signal and the regenerated residual signal restored by the restoration means.

According to the image prediction decoding device, image prediction decoding method, and image prediction decoding program, a first predictive method for generating, for regenerated adjacent areas which are adjacent to the target area which is the decoding target, a predictive signal which has a high correlation to the pixel signals of the adjacent areas by using data processed in accordance with the adjacent areas is derived, a second predictive method for the target area is derived on the basis of the first predictive method and the relative predictive method and an intra frame predictive signal is generated, and the intra frame predictive signal is used to restore the pixel signal of the target area from the regenerated residual signal obtained by restoring the residual signal of the target area. The predictive method which is derived for the adjacent areas by using processed data corresponding to the regenerated adjacent areas have a high probability of being close to the optimum predictive method for the target area. Hence, by restoring the predictive method-related mode information of the target area relatively by using this predictive method, the bit amount for encoding of the mode information (relative predictive method) identifying the predictive method is reduced and the overall decoding efficiency improves.

Furthermore, the first predictive method determination means preferably generates a plurality of predictive signals for the adjacent areas corresponding to a predetermined plurality of predictive methods and determines the first predictive method from among the plurality of predictive methods in accordance with a predetermined evaluation standard. In this case, a predictive method which is close to the optimum predictive method for the target area can be easily specified on the basis of a regenerated pixel signal by determining the first predictive method for the adjacent areas from among the plurality of predictive methods in accordance with a predetermined evaluation standard.

In addition, the first predictive method determination means preferably uses three or more predictive methods which are previously determined according to the adjacent areas to determine the first predictive method for the adjacent areas in accordance with a predetermined evaluation standard. If such a constitution is adopted, a predictive method which is close to the optimum predictive method for the target area can be easily specified by using the three or more predictive methods determined for the adjacent areas to determine the first predictive method in accordance with a predetermined evaluation standard.

Effect of the Invention

The present invention permits efficient encoding processing or decoding processing by reducing predictive method-related mode information for generating an intra frame predictive signal in a pixel domain.

LIST OF SYMBOLS

10 . . . IMAGE PREDICTIVE ENCODING DEVICE, 11 . . . INPUT TERMINAL, 12 . . . BLOCK DIVISION SECTION, 13 . . . INTER FRAME PREDICTIVE SIGNAL GENERATION METHOD DETERMINATION SECTION, 14 . . . INTER FRAME PREDICTIVE SIGNAL GENERATION SECTION, 15 . . . INTRA FRAME PREDICTIVE SIGNAL GENERATION METHOD DETERMINATION SECTION, 16 . . . INTRA FRAME PREDICTIVE SIGNAL GENERATION SECTION, 17 . . . SWITCHING SWITCH, 18 . . . SUBTRACTOR, 19 . . . TRANSFORM SECTION, 20 . . . QUANTIZATION SECTION, 21 . . . REVERSE QUANTIZATION SECTION, 22 . . . INVERSE TRANSFORM SECTION, 23 . . . ADDER, 24 FRAME MEMORY, 25 . . . ENTROPY ENCODING SECTION, 26 . . . OUTPUT TERMINAL, 41 . . . PREDICTIVE METHOD DETERMINATION SECTION, 42 . . . PREDICTIVE SIGNAL GENERATION SECTION, 43 . . . R MODE DETERMINATION SECTION, 44 . . . STORAGE SECTION, 45 . . . MODE INFORMATION PREDICTION SECTION, 46 . . . L MODE DETERMINATION SECTION, 50 . . . IMAGE PREDICTIVE DECODING DEVICE, 51 . . . DATA ANALYSIS SECTION, 52 . . . REVERSE QUANTIZATION SECTION, 53 . . . INVERSE TRANSFORM SECTION, 54 . . . ADDER, 55 . . . PREDICTIVE SIGNAL GENERATION SECTION, 56 . . . FRAME MEMORY, 57 . . . PREDICTIVE METHOD ACQUISITION SECTION, 58 . . . INPUT TERMINAL, 59 . . . OUTPUT TERMINAL, 61 . . . SWITCHING SWITCH, 64 . . . R MODE DETERMINATION SECTION, 65 . . . STORAGE SECTION, 66 . . . L MODE DETERMINATION SECTION, 67 . . . MODE INFORMATION GENERATION SECTION, 115 . . . INTRA FRAME PREDICTIVE SIGNAL GENERATION METHOD DETERMINATION SECTION, 143 . . . F MODE DETERMINATION SECTION, 157 . . . PREDICTIVE METHOD ACQUISITION SECTION, 164 . . . F MODE INFORMATION STORAGE SECTION, 301, 401, 901, . . . TARGET AREA, 302a to 302f, 303a to 303c, 402 to 406, and 902 to 904 . . . ADJACENT AREA.

BEST MODE FOR CARRYING OUT THE INVENTION

Preferred embodiments of the image prediction encoding device and image prediction decoding device according to the present invention will be described in detail hereinbelow with reference to the drawings.

(Image Prediction Encoding Device)

Figure 1:
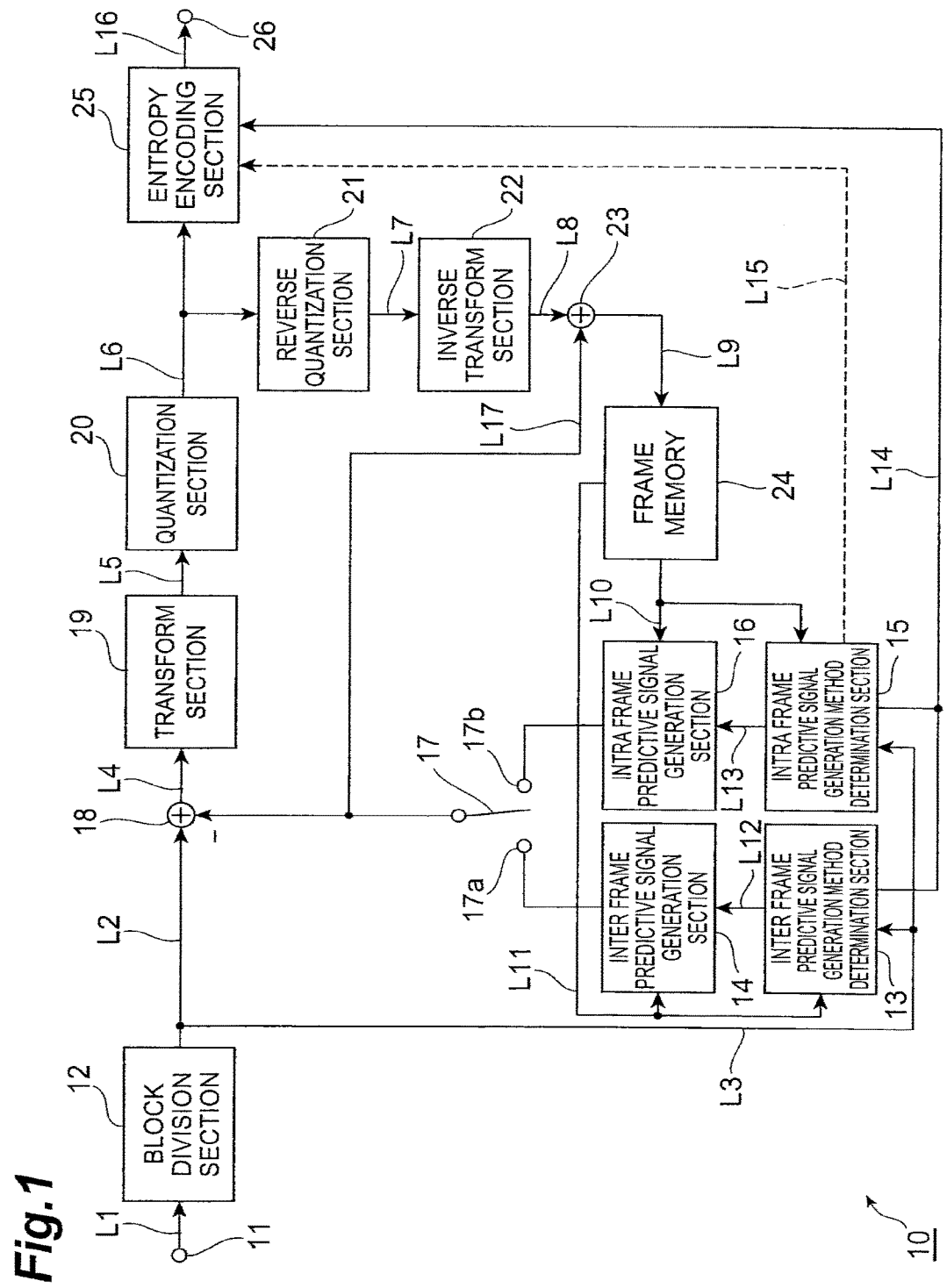
[FIG. 1] A block diagram which shows the constitution of an image predictive encoding device according to a preferred embodiment of the present invention.

FIG. 1 is a block diagram which shows the constitution of the image predictive encoding device according to a preferred embodiment of the present invention. The image predictive encoding device 10 shown in FIG. 1 is constituted comprising an input terminal 11, a block division section 12, an inter frame predictive signal generation method determination section 13, an inter frame predictive signal generation section 14, an intra frame predictive signal generation method determination section 15, an intra frame predictive signal generation section (predictive signal generation means) 16, a switching switch 17, a subtractor (image encoding means) 18, a transform section (image encoding means) 19, a quantization section (image encoding means) 20, a reverse quantization section 21, a inverse transform section 22, an adder 23, a frame memory 24, an entropy encoding section (image encoding means) 25, and an output terminal 26. The respective constituent elements of the image predictive encoding device 10 will be described hereinbelow.

The block division section 12 receives an input of moving image data comprising a plurality of frames' worth of image data from the input terminal 11 and divides the image data into a plurality of areas. More specifically, the block division section 12 may divide the image data into blocks consisting of 8×8 pixels but may also divide the image data into blocks of another optional size and shape. The block division section 12 outputs the divided block pixel signals via a line L2 to a subtractor 18 and via a line L3 to the inter frame predictive signal generation method determination section 13 and the intra frame predictive signal generation method determination section 15.

The inter frame predictive signal generation section 14 and intra frame predictive signal generation section 16 generates a predictive signal which predicts a target block image with respect to the area constituting the target for the encoding processing (called the 'target block' hereinbelow). Here, the inter frame predictive signal generation section 14 uses a predictive method known as 'inter frame prediction' in the generation of the predictive signal and the intra frame predictive signal generation section 16 employs a predictive method known as 'intra frame prediction'. In the case of 'inter frame prediction', a predictive method is determined by taking a regenerated image that has been restored after being previously encoded as the reference image and finding motion information which supplies the predictive signal with the smallest error with respect to the target block from the reference image (called 'motion detection' processing). In contrast, in 'intra frame prediction', an intra frame predictive signal is generated by means of a predetermined method by using regenerated pixel values which are spatially adjacent to the target block. This predictive method can also be applied to the encoding and decoding of still images.

The inter frame predictive signal generation method determination section 13 determines an inter frame predictive method by performing the aforementioned motion detection on the basis of a reference image which is input from the frame memory 24 via a line L11 and a target block pixel signal which is input via line L3. Here, the inter frame predictive signal generation method determination section 13 may redivide the target block to determine the inter frame predictive method for the redivided small areas and is able to select the division method with the greatest efficiency for the whole of the target block from various area division methods. In addition, a plurality of images which are restored after being previously encoded may also be used as reference images. This motion detection method is similar to either of the conventional MPEG2, MPEG4 and H.264 methods and a detailed description thereof is therefore omitted. The inter frame predictive signal generation method determination section 13 sends the determined motion information and small area division method to the inter frame predictive signal generation section 14 via a line L12 and sends the determined motion information and small area division method to the entropy encoding section 25 via a line L14. In contrast, the inter frame predictive signal generation section 14 generates a predictive signal on the basis of the small-area division method, the motion information corresponding to each of the small areas, and a reference image which is acquired from the frame memory 24 and sends the predictive signal to the subtractor 18 and adder 23 via a terminal 17a and the switching switch 17.

The intra frame predictive signal generation method determination section 15 determines the intra frame prediction predictive method (subsequently described in detail) on the basis of the target block pixel signal input via line L3 and the reference image input from the frame memory 24 via a line L10. The intra frame predictive signal generation method determination section 15 sends information relating to the determined predictive method to the intra frame predictive signal generation section 16 via line L13 and to the entropy encoding section 25 via line L14 or L15. In response, the intra frame predictive signal generation section 16 generates a predictive signal by means of a predetermined method on the basis of the predictive method-related information and the regenerated pixel signals in the same frame acquired from the frame memory 24 and sends the predictive signal to the subtractor 18 and adder 23 via a terminal 17b and the switching switch 17.

Given the predictive signals sent from the inter frame predictive signal generation section 14 and from intra frame predictive signal generation section 16, the switching switch 17 judges which of the predictive signals has a smaller error with respect to the target area pixel signal, and selects the predictive signal with the smaller measurement error in accordance with the judgment result before outputting same to the subtractor 18 and adder 23. However, in cases where all of the blocks are processed by means of intra frame prediction because a previous image does not exist for the first frame, the switching switch 17 is always connected to terminal 17b of the intra frame predictive signal generation section 16 when processing the first image. Similarly, in cases where a frame directly following a scene change is processed and in cases where there is a need to introduce the intra frame prediction image periodically, the switching switch 17 also selects the predictive signal generated by the intra frame prediction for the whole frame.

The subtractor 18 generates a residual signal by subtracting the predictive signal which is input via the switching switch 17 from the target block pixel signal input from the block division section 12. This residual signal is output to the transform section 19 via line L4 and the transform section 19 generates a transform coefficient by performing discrete cosine transform on the residual signal. The transform coefficient is output to the quantization section 20 via line L5 and, after quantizing the transform coefficient, the quantization section 20 outputs the quantized transform coefficient to the entropy encoding section 25 and the reverse quantization section 21 via line L6. The entropy encoding section 25 encodes the quantized transform coefficient, combines it with the motion information output by the inter frame predictive signal generation method determination section 13 and information relating to the small-area division method or relating to the predictive method which is output by the intra frame predictive signal generation method determination section 15 and outputs same to the output terminal 26.

The reverse quantization section 21 performs reverse quantization on the quantized transform coefficient to restore same to the transform coefficient and outputs the transform coefficient to the inverse transform section 22 via a line L7. The inverse transform section 22 restores the residual signal by subjecting the transform coefficient to reverse discrete cosine transform. The adder 23 regenerates a target block pixel signal by combining this residual signal with the predictive signal input via line L17 and stores the pixel signal in the frame memory 24 via a line L9. The target block pixel signal stored in the frame memory 24 is utilized to generate the target block predictive signal which is processed next.

Figure 2:
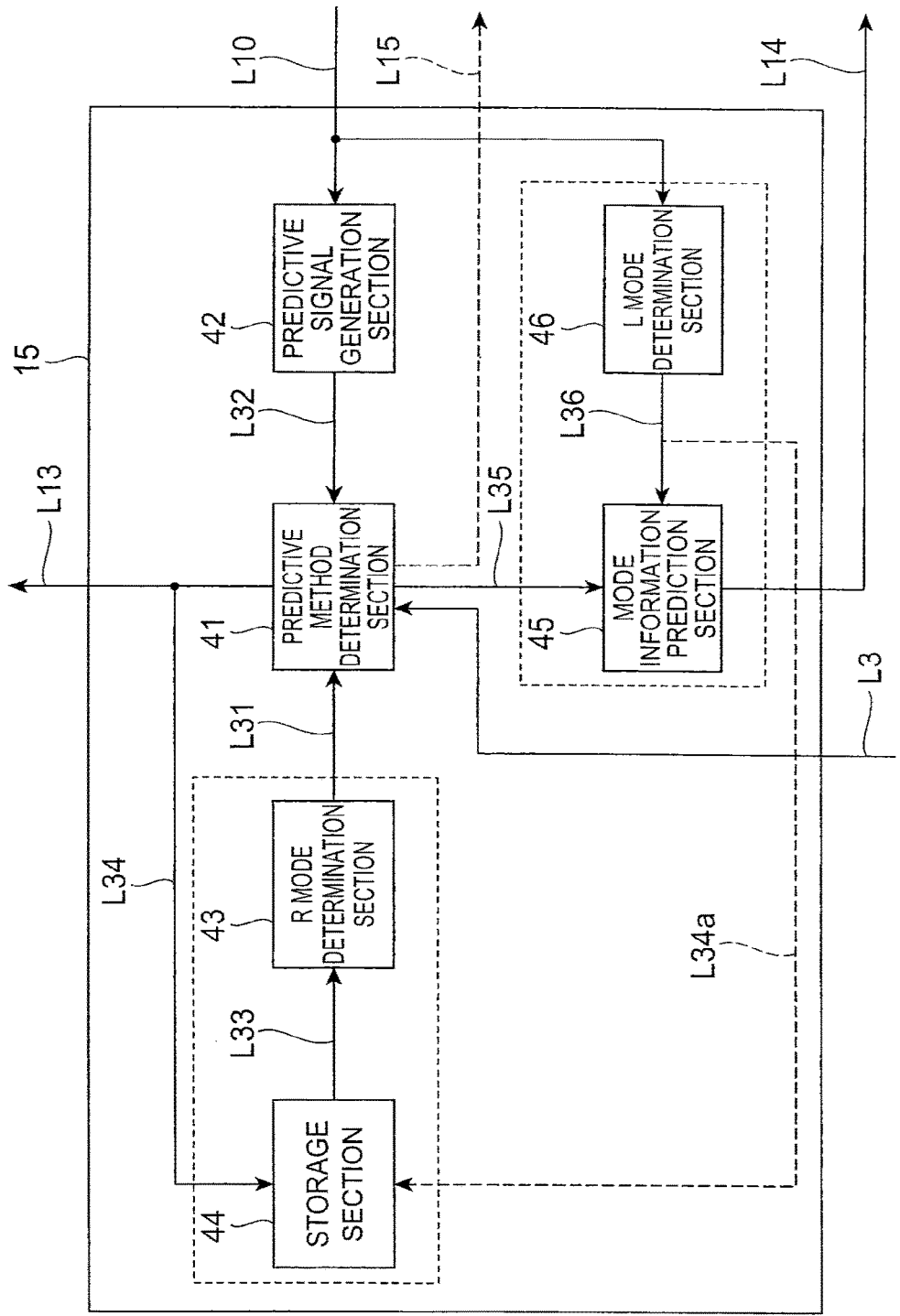
[FIG. 2] A block diagram which shows the constitution of the intra frame predictive signal generation method determination section in FIG. 1.

The constitution of the intra frame predictive signal generation method determination section 15 will be described next in detail. FIG. 2 is a block diagram which shows the constitution of the intra frame predictive signal generation method determination section 15. As shown in FIG. 2, the intra frame predictive signal generation method determination section 15 comprises a predictive method determination section (second predictive method determination means, mode information encoding means) 41, a predictive signal generation section (second predictive method determination means) 42, an R mode determination section (first predictive method determination means) 43, a storage section 44, a mode information prediction section (mode information encoding means) 45, and an L mode determination section (first predictive method determination means) 46.

The predictive signal generation section 42 uses regenerated pixels adjacent to the target block which are read from the frame memory 24 via line L10 to generate a predictive signal by means of nine methods. More specifically, as shown in (a) of FIG. 14, the predictive signal generation section 42 uses the regenerated pixel group 905 adjacent to the boundary of block 901 which is the target block to generate a predictive signal for the block 901 in the nine directions shown in (b) of FIG. 14. For example, in the case of direction 0, a predictive signal is generated by extending the adjacent pixel directly above block 901 downward and, in the case of direction 1, a predictive signal is generated by extending the regenerated pixel to the left of block 901 to the right. The details of the method for generating the predictive signal appear in U.S. Pat. No. 6,148,109, for example. The predictive signal generation section 42 sends the nine predictive signals thus generated to a predictive method determination section 41 via a line L32. In addition to generating the nine predictive signals, the predictive signal generation section 42 may also generate a greater number or a smaller number of predictive signals. The predictive signals may also be generated by means of a different method from that mentioned above, such as spline extrapolation, for example.

Figure 14:
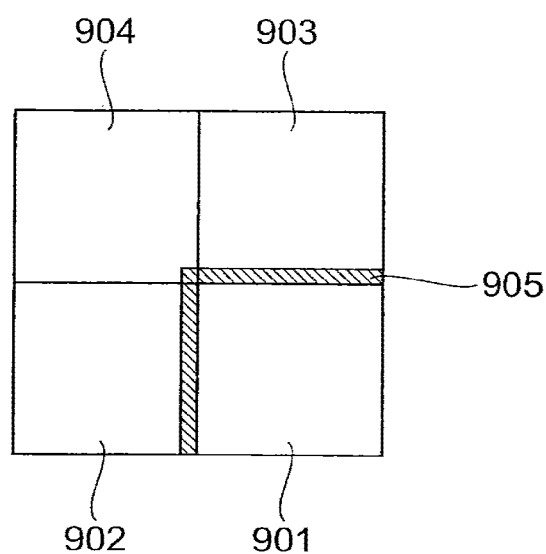
[FIG. 14] (a) is a schematic diagram serving to illustrate the intra frame predictive method used in H.264 and (b) shows the direction for extending the pixel signal of the H.264 intra frame predictive method.
Figure 14:
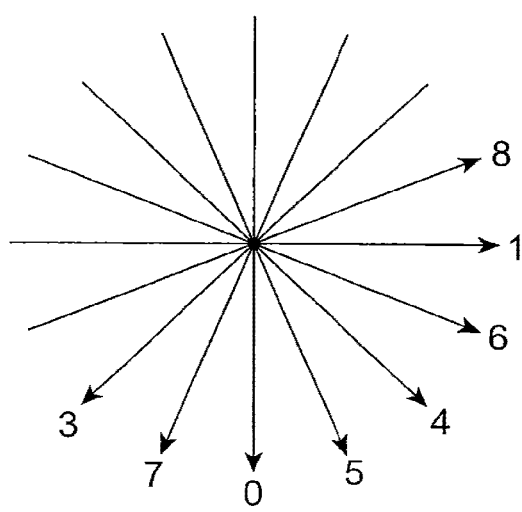

An R mode determination section 43 uses a predetermined evaluation standard to derive one predictive method for generating an intra frame predictive signal which is highly correlated to the adjacent area pixel signals from among the nine predictive methods (see (b) of FIG. 14) on the basis of the predictive method-related mode information determined in accordance with a regenerated adjacent area. In other words, the R mode determination section 43 acquires a plurality of predictive method-related mode information for the previously processed blocks stored in the storage section 44 and determines the predictive method by means of a predetermined method (R mode prediction). Here, the storage section 44 stores predictive method-related mode information which was determined in accordance with previously processed blocks via a line L34.

Figure 3:
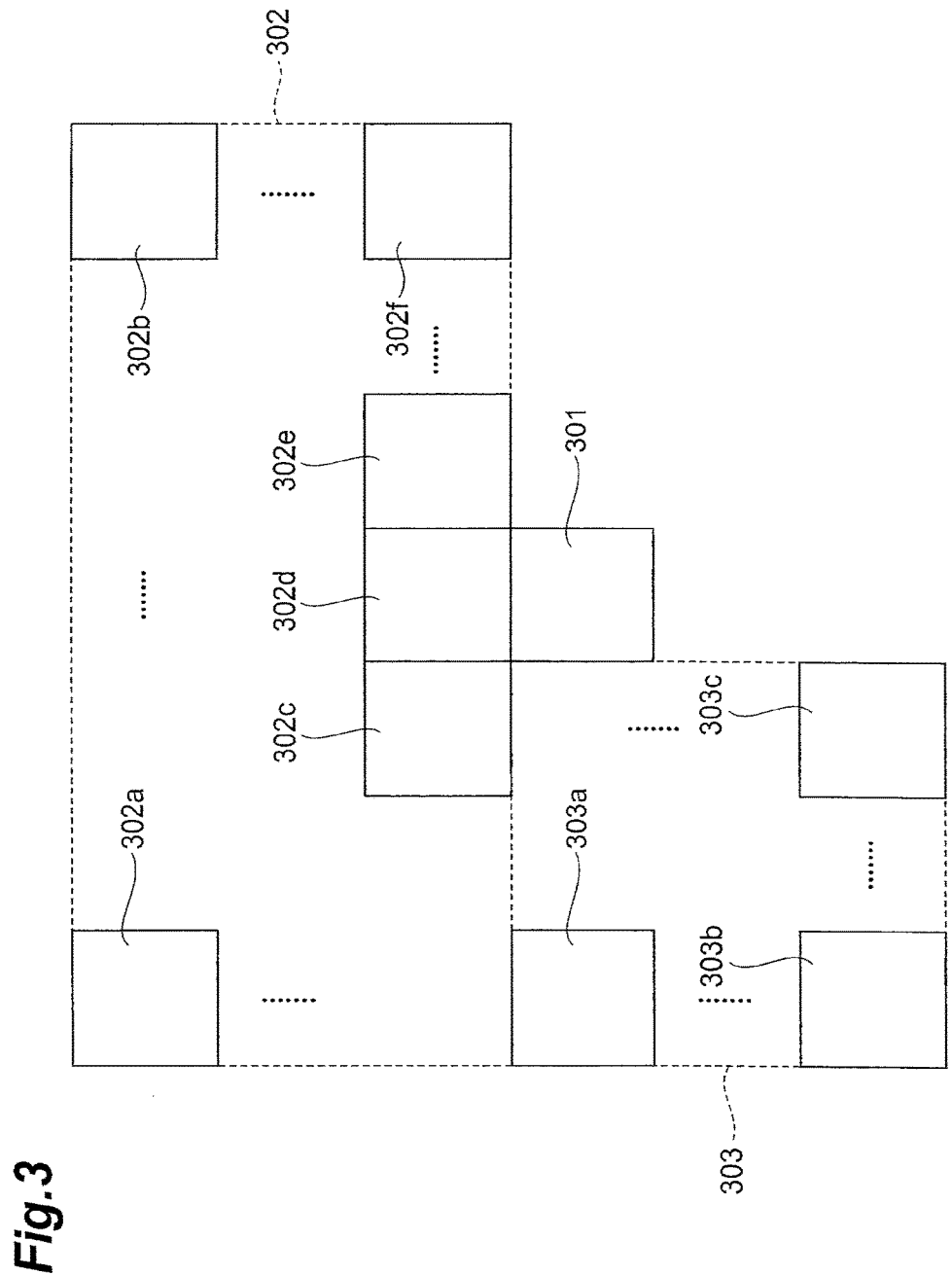
[FIG. 3] A schematic diagram serving to illustrate processing to determine an R mode predictive method of an R mode determination section in FIG. 2.

FIG. 3 is a schematic diagram serving to illustrate processing to determine the R mode predictive method. In FIG. 3, the target block is 301. 302 and 303 represent areas of adjacent pixels which have been previously encoded and restored. Area 302 comprises blocks 302a to 302f and area 303 comprises blocks 303a to 303c, and these blocks possess predictive method-related mode information which is used when encoding each of these blocks. Area 302 is an area comprising blocks of 12 (horizontal)×4 (vertical) pixels and area 303 is an area which comprises blocks of 4×4 pixels. However, these areas may also be areas of another size and shape. The adjacent blocks of the prior art are only block 302d which is above the target block 301 and the block to the left of target block 301 (not shown) and the description will focus on the differences from this embodiment.

Therefore, the R mode determination section 43 determines the predictive method which corresponds with mode information of the highest incidence among the intra frame prediction-related mode information items owned by the blocks 302a to 302f and 303a to 303c stored in the storage section 44 as the R mode predictive method which is the predictive method with the highest correlation to all the pixels adjacent to the target block. The R mode determination section 43 may also determine the R mode predictive method on the basis of the mode information determined in accordance with three or more blocks by using another method and may use an area of a different size and shape as the area obtained by joining areas 302 and 303. The R mode determination section 43 sends the R mode predictive method-related information to the predictive method determination section 41 via a line L31. The R mode determination section 43 may use a predetermined function to process the R mode predictive method-related identification information as the target and send the identification information obtained as a result of the processing to the predictive method determination section 41. A function that may be cited as such a function is a function to add ±n (where n is an optional integer) to the identification information in cases where the identification information comprises numerical value information.

When a target block pixel signal is input via line L3, the predictive method determination section 41 finds the difference between the nine predictive signals sent via a line L32 and the target block signal and determines the predictive signal which supplies the smallest differential value as the optimum predictive signal. The predictive method determination section 41 sends predictive method-related mode information according to the optimum predictive signal to the intra frame predictive signal generation section 16 (see FIG. 1) via line L13 and sends the predictive method-related mode information to a mode information prediction section 45 via a line L35.

In addition, the predictive method determination section 41 encodes the predictive method-related mode information pertaining to the optimum predictive signal on the basis of the R mode predictive method-related information. More specifically, the predictive method determination section 41 performs encoding to produce identification information '0' in cases where the optimum predictive method coincides with the R mode predictive method and performs encoding to produce identification information '1' in other cases, and sends the identification information to the entropy encoding section 25 (see FIG. 1) via line L15. In other words, the predictive method determination section 41 need not send information other than the identification information to a downstream processing section in cases where the identification information is '0'. This is because the intra frame predictive signal generation section 16 generates an intra frame predictive signal by means of the same predictive method as the predictive method determined by means of the R mode predictive method and it is therefore possible to determine the predictive method by means of the same R mode determination method on the regeneration side. In contrast, in cases where the identification information is '1', it is necessary to also send predictive method-related mode information (the details will be provided subsequently). The predictive method determination section 41 may also operate to determine the R mode predictive method as the optimum predictive method without further processing and send the R mode predictive method to the intra frame predictive signal generation section 16.

Figure 4:
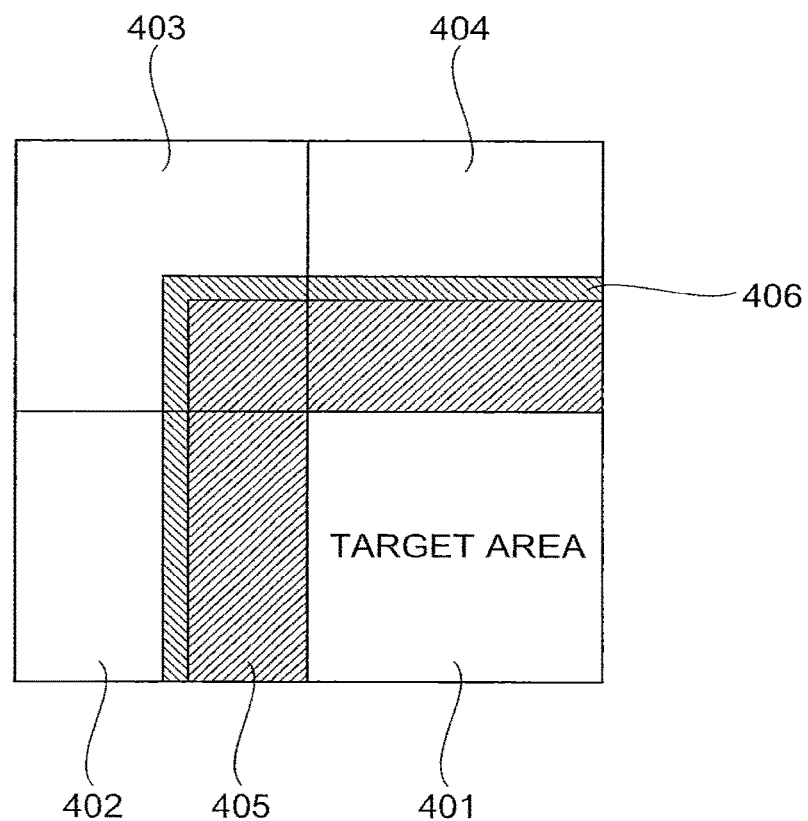
[FIG. 4] A schematic diagram serving to illustrate processing to determine an L mode predictive method of an L mode determination section in FIG. 2.

The L mode determination section 46 uses a predetermined evaluation standard to derive one predictive method for generating an intra frame predictive signal which is highly correlated to the adjacent area pixel signals from among the nine predictive methods (see (b) of FIG. 14) on the basis of the regenerated pixel signals in accordance with an area comprising adjacent areas. In other words, the L mode determination section 46 determines once again the predictive method for adjacent areas which are adjacent to the target block while referencing the data stored in the frame memory 24 (L mode prediction). FIG. 4 is a schematic diagram which serves to illustrate processing to determine the L mode predictive method by means of the L mode determination section 46. Block 401 is the target area. Blocks 402 to 404 are regenerated adjacent blocks. The area 405 which is filled with oblique lines is an adjacent area of the target block 401. Area 405 is a reverse L-shaped area which encloses four pixels above the boundary of the target block and four pixels to the left of the boundary of the target block but an adjacent area 405 of a different size and shape may also be employed. The L mode determination section 46 uses a pixel group of an area 406 which is adjacent to the reverse L-shaped area to generate nine predictive signals for the reverse L-shaped area 405 by means of the same predictive method as the method illustrated in FIG. 14. In addition, the L mode determination section 46 calculates the difference between the signal of the reverse L-shaped area 405 and nine predictive signals and determines the predictive mode information which corresponds with the predictive method which supplies the predictive signal with the smallest differential (prediction information relating to the first predictive method) as the predictive method which is highly correlated to the pixels of the reverse L-shaped area 405 of the target block.

Figure 5:
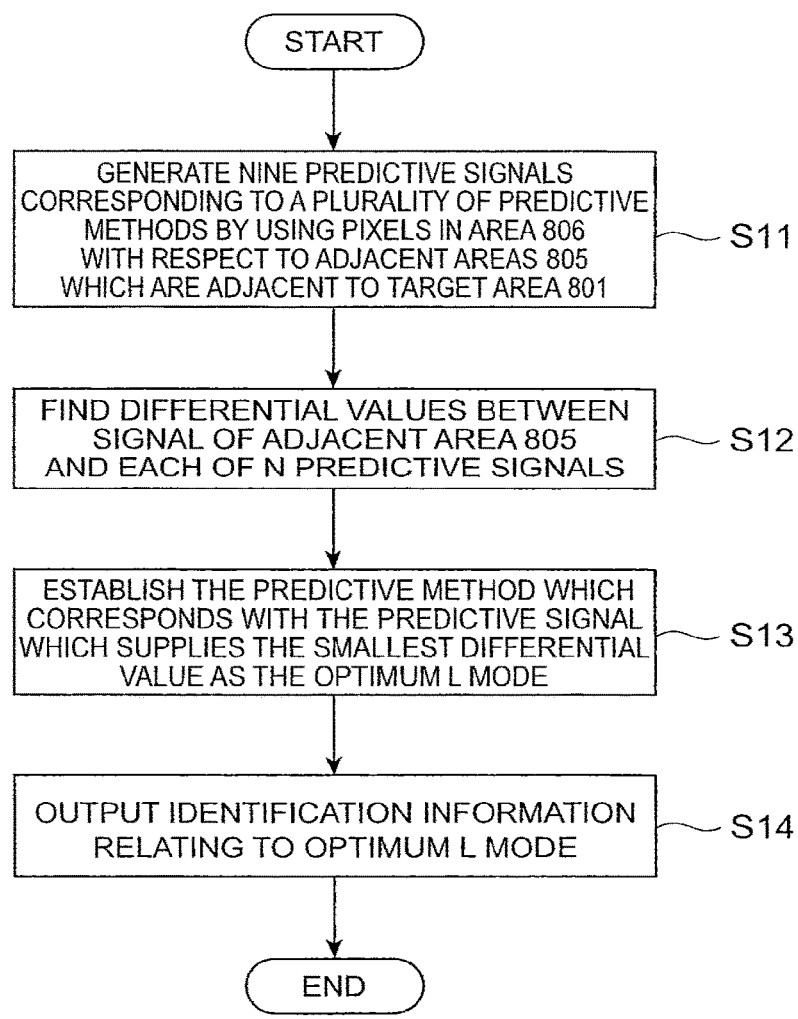
[FIG. 5] A flowchart which shows processing to determine an L mode predictive method using the L mode determination section in FIG. 2.

The flow of the processing of the L mode predictive method by the L mode determination section 46 will be described hereinbelow with reference to FIG. 5. First, the L mode determination section 46 generates nine predictive signals by using a pixel group in area 406 for adjacent area 405 which is adjacent to target area 401 (step S11). Thereafter, the L mode determination section 46 finds each of the differential values between the signal of adjacent area 405 of the reverse L-shaped area and the nine predictive signals (step S12). Thereafter, the L mode determination section 46 takes the predictive method which corresponds with the predictive signal which supplies the smallest differential value as the optimum L mode (first predictive method) (step S13). Finally, the L mode determination section 46 outputs information relating to the optimum L mode to the mode information prediction section 45 and storage section 44 (step S14). The L mode determination section 46 may use a predetermined function to process L mode predictive method-related identification information as the target and send the identification information obtained as a result of the processing to the mode information prediction section 45 and the storage section 44. A function that may be cited as such a function is a function to add ±n (where n is an optional integer) to the identification information in cases where the identification information comprises numerical value information.

Returning now to FIG. 2, the mode information prediction section 45 encodes predictive method-related mode information pertaining to the optimum predictive signal on the basis of the optimum L mode-related information input from the L mode determination section 46. Here, the mode information prediction section 45 receives an input of first predictive method-related information which is sent from the L mode determination section 46 and target block optimum predictive method-related information which is sent from the predictive method determination section 41. The mode information prediction section 45 relatively encodes the target block optimum predictive method-related mode information with respect to the optimum L mode-related information. A method of performing relative encoding that may be cited is a method that performs encoding by finding the differential value between mode information representing the optimum predictive method for the target block and mode information representing the optimum L mode. However, other methods may also be applied. The mode information prediction section 45 sends the relative prediction information obtained in this manner to the entropy encoding section 25 via a line L14.

Figure 6:
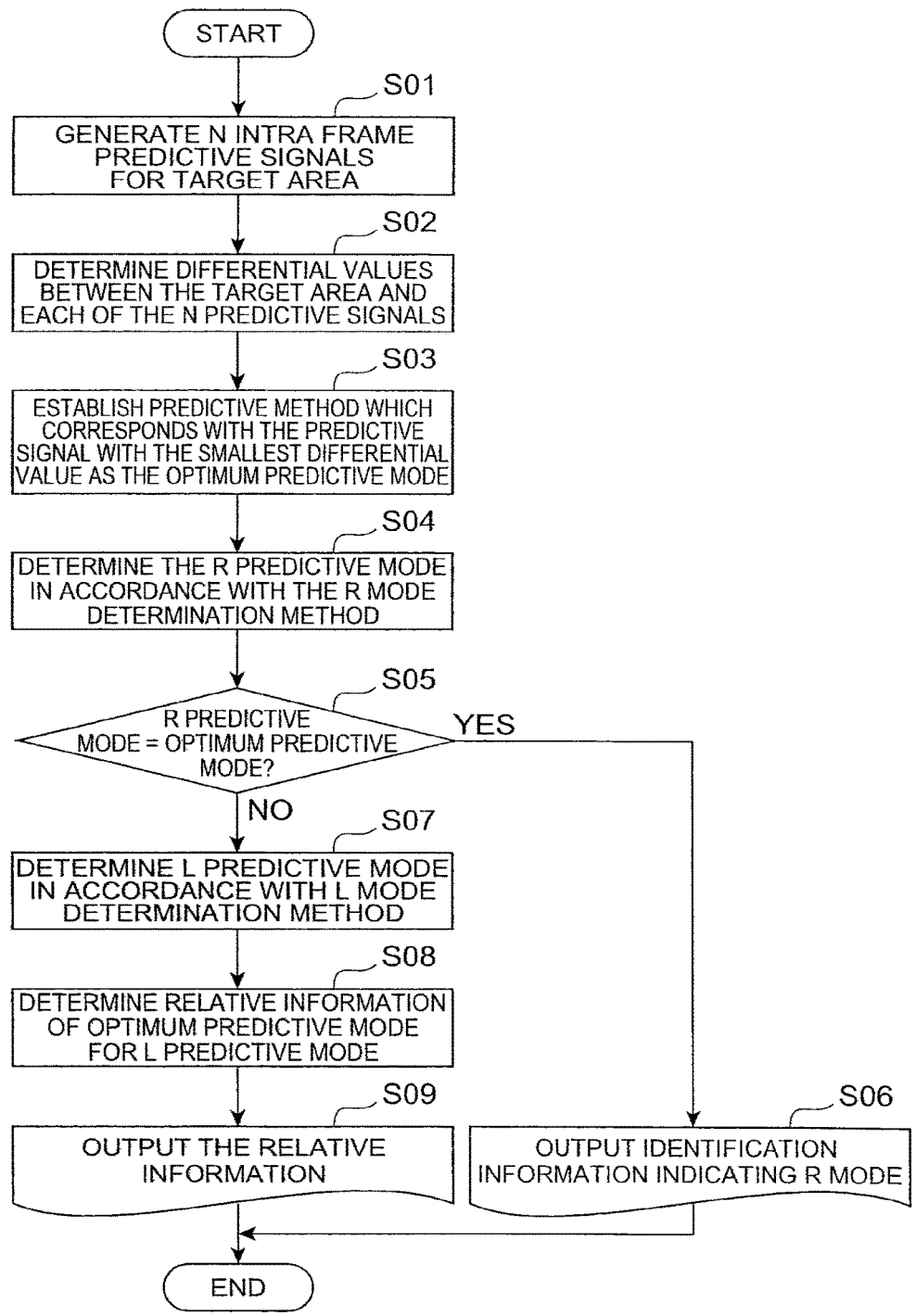
[FIG. 6] A flowchart which shows processing to determine the predictive signal generation method of the intra frame predictive signal generation method determination section in FIG. 1.

The method of determining the predictive signal generation method of the intra frame predictive signal generation method determination section 15 will be described next with reference to FIG. 6. First, the predictive signal generation section 42 generates nine intra frame predictive signals by means of the above method for the target block (step S01). Thereafter, the predictive method determination section 41 finds the difference between the target block image and the nine predictive signals (step S02). The predictive method determination section 41 then determines the predictive method which supplies the smallest differential value as the optimum predictive mode (step S03). However, the R mode determination section 43 determines the optimum R mode predictive method by means of the above method (step S04). Here, because the R mode predictive method thus determined is determined based on the previously determined mode, this mode corresponds to any of nine modes. Thereafter, the predictive method determination section 41 compares the R mode predictive method with the optimum predictive mode determined in step S03 and judges whether the two coincide (step S05). In cases where the R mode predictive method and the optimum predictive method are the same (step S05; YES), the predictive method determination section 41 outputs identification information '0' which indicates that the R mode predictive method is the predictive method used in the generation of the intra frame predictive signal (step S06). However, in cases where the optimum predictive mode does not coincide with the R mode predictive method (step S05; NO), the L mode determination section 46 determines the L mode predictive method by means of the above method (step S07). In addition, the mode information prediction section 45 encodes the relative predictive method which is relative information for the optimum predictive mode with respect to the L mode predictive method-related information (step S08). Finally, the mode information prediction section 45 outputs the relative prediction information (step S09).

With the image predictive encoding device 10 described earlier, the R mode and L mode predictive methods are derived by using data processed in accordance with the adjacent area with respect to regenerated adjacent areas which are adjacent to the target area which is the encoding target, the optimum predictive method for generating an intra frame predictive signal for the target area is encoded on the basis of the predictive method, and the residual signal of the target area is encoded by using an intra frame predictive signal. The R mode and L mode predictive methods which are derived for the adjacent areas by using the data corresponding to regenerated adjacent areas have a high probability of being close to the optimum predictive method for the target area. Hence, by encoding the predictive method-related mode information of the target area relatively by using the R mode and L mode predictive methods, the bit amount for encoding of the mode information identifying the predictive method is reduced and the overall encoding efficiency improves.

In particular, in cases where the predictive method is determined on a predetermined evaluation standard by using three or more predictive method-related information items which a plurality of adjacent blocks adjacent to the target block each possess as per R mode, there is a high probability that the predictive method will be close to the original predictive method of the target area. Therefore, because this predictive method can be taken as the target area predictive method, there is no need to transmit mode information for identifying the predictive method (information identifying nine modes shown in (b) of FIG. 14, for example). As a result, the bit amount according to the mode information can be reduced by means of simple processing.

Furthermore, in cases where the predictive method which was determined from the nine predictive methods for the areas adjacent to the target block is used as per L mode, there is a high correlation to the target block predictive method and the target block mode information can be more efficiently encoded on the basis of the predictive method. As a result, the effect of reducing the bit amount pertaining to the mode information increases. Furthermore, in cases where the areas adjacent to the target block are subjected to inter frame predictive encoding, even when the adjacent blocks do not have intra frame prediction information, information relating to a predictive method determined from a plurality of predictive methods for the areas adjacent to the target block or a predictive method which three or more of the adjacent blocks each possess is used to determine a predictive method on a predetermined evaluation standard. Then, the target area prediction information is encoded based on the determined predictive method. As a result, the predictive method-related information of the target block can be more efficiently encoded.

(Image Prediction Decoding Device)

Figure 7:
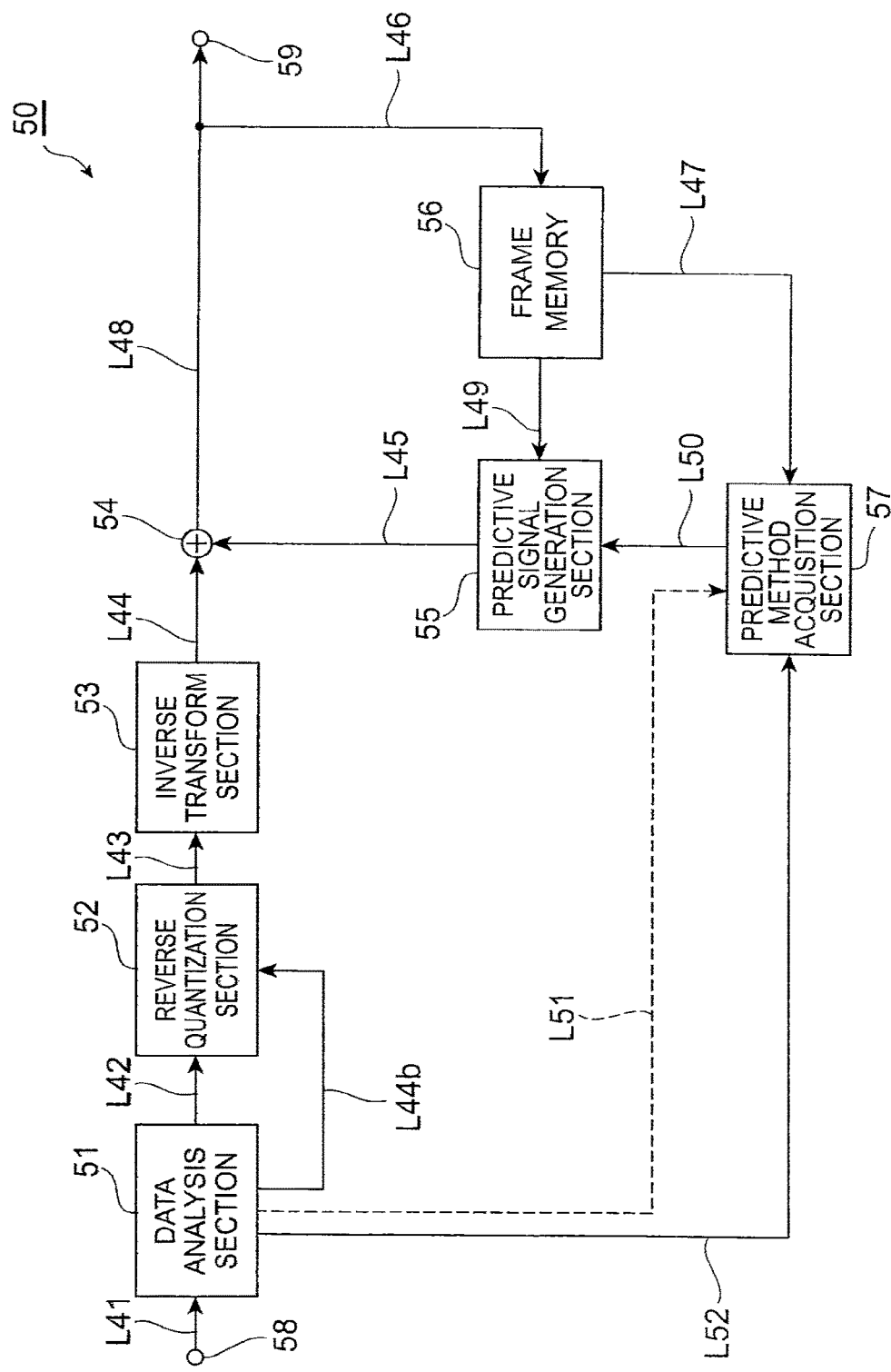
[FIG. 7] A block diagram which shows the constitution of an image predictive decoding device according to a preferred embodiment of the present invention.

FIG. 7 is a block diagram which shows the constitution of the image predictive decoding device according to a preferred embodiment of the present invention. The image predictive decoding device 50 shown in FIG. 7 is constituted comprising an input terminal 58, a data analysis section (restoration means) 51, a reverse quantization section (restoration means) 52, a inverse transform section (restoration means) 53, an adder (image decoding means) 54, a predictive signal generation section (predictive signal generation means) 55, a frame memory 56, a predictive method acquisition section 57, and an output terminal 59. The respective constituent elements of the image predictive decoding device 50 will be described hereinbelow.

The data analysis section 51 receives an input of compressed image data which have been compressed and encoded from the input terminal 58 and extracts a target block residual signal, predictive method-related information, quantization parameters, and motion information (in the case of inter frame prediction) from the compressed image data. The compressed image data contains a residual signal obtained by performing predictive encoding with the target block resulting from the division of a single frame image into a plurality of blocks constituting the target and predictive method-related mode information. The data analysis section 51 outputs the extracted residual signal and quantization parameters to the reverse quantization section 52 via a line L42 and a line L44b and outputs motion information and R mode-related identification information and L mode predictive method-related relative prediction information contained in the mode information to the predictive method acquisition section 57 via a line L51 and a line L52. In cases where the R mode-related identification information is '0', this indicates that R mode is used as the predictive method and a case where the R mode-related identification information is '1' indicates that L mode is used as the predictive method. Relative prediction information indicates a relative value for the predictive method-related information in the L mode case.

The reverse quantization section 52 subjects the target block residual signal to reverse quantization on the basis of the quantization parameters. The reverse quantization section 52 outputs the reverse-quantized residual signal to the inverse transform section 53 via a line L43.

The inverse transform section 53 performs a inverse discrete cosine transform on the residual signal input from the reverse quantization section 52 to restore the regenerated residual signal. The inverse transform section 53 outputs the regenerated residual signal thus restored to the adder 54 via a line L44.

The predictive signal generation section 55 acquires a reference image signal from the frame memory 56 on the basis of the predictive method derived by the predictive method acquisition section 57 (the details of which will be provided subsequently) and generates a predictive signal. The predictive signal generation section 55 sends the predictive signal to the adder 54 via a line L45 and the adder 54 restores the target block pixel signal by combining the regenerated residual signal restored by the inverse transform section 53 with the predictive signal and stores the target block pixel signal in the frame memory 56 at the same time as outputting same to the output terminal 59 via a line L48.

Figure 8:
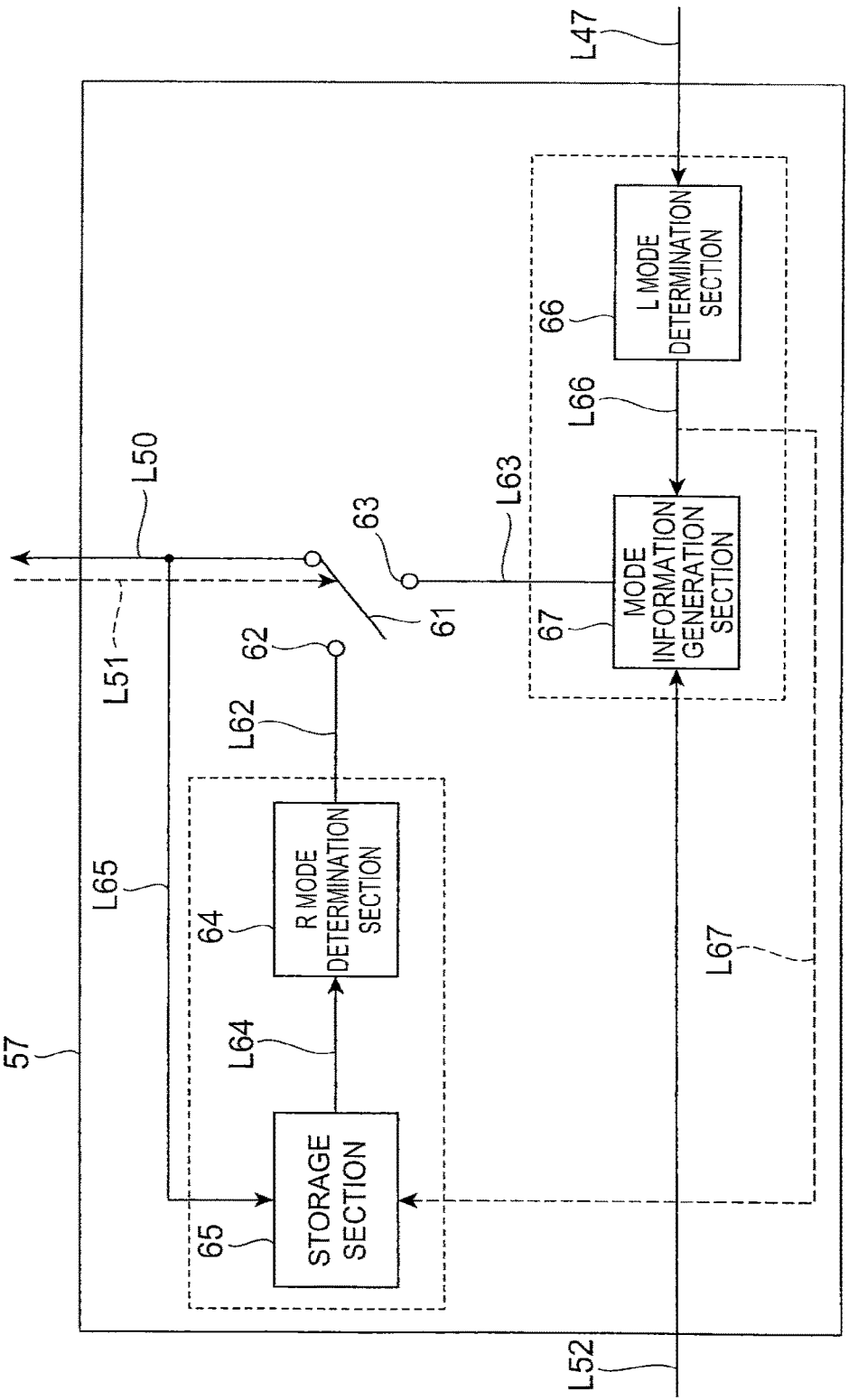
[FIG. 8] A block diagram which shows the constitution of a predictive method acquisition section in FIG. 7.

The constitution of the predictive method acquisition section 57 will be described next in detail. FIG. 8 is a block diagram which shows the constitution of the predictive method acquisition section 57. As shown in FIG. 8, the predictive method acquisition section 57 comprises a switching switch 61, an R mode determination section (first predictive method determination means) 64, a storage section 65, an L mode determination section (first predictive method determination means) 66, and a mode information generation section (predictive method deriving means) 67.

The switching switch 61 is a switch which switches the connection between the predictive signal generation section 55 and terminals 62 and 63 in accordance with the R mode identification information which is input via line L51. More specifically, the switching switch 61 connects to terminal 62 when the identification information is '0' and connects to terminal 63 when the identification information is '1'.

An R mode determination section 64 derives one predictive method on a predetermined evaluation standard for the regenerated adjacent areas, on the basis of predictive method-related mode information which is determined in accordance with the adjacent areas. In other words, the R mode determination section 64 acquires three or more predictive method-related mode information items for previously processed blocks which are stored in the storage section 65 and determines one predictive method by means of a predetermined method. The R mode predictive method determination method is the same as that for the R mode determination section 43 of the image predictive encoding device 10. That is, the R mode determination section 64 determines the predictive method which corresponds with the mode information with the highest incidence among the intra frame predictive method-related mode information items which blocks 302a to 302f and 303a to 303c (see FIG. 3) possess as the R mode predictive method. The R mode determination section 64 may also determine the R mode predictive method on the basis of the mode information of three or more blocks by means of another method. The R mode determination section 64 sends the R mode predictive method-related information to the predictive signal generation section 55 via a line L50 in cases where the switching switch 61 is connected to terminal 62.

The mode information generation section 67 generates optimum predictive method-related information in cases where the switching switch 61 is connected to terminal 63 and L mode is used and sends the optimum predictive method-related information to the predictive signal generation section 55. Thereupon, the mode information generation section 67 derives information relating to the optimum predictive method used in the predictive signal generation on the basis of relative prediction information of predictive method-related information input via line L52 and L mode predictive method-related information that is input from the L mode determination section 66. In other words, the mode information generation section 67 generates optimum predictive method-related predictive mode information by adding relative prediction information relating to the target block predictive method to the L mode predictive method-related information.

The L mode determination section 66 determines the predictive mode from among a predetermined plurality of predictive modes for adjacent areas which are adjacent to the target block and outputs the predictive mode to the mode information generation section 67 via a line L66 as the L mode predictive method. The predictive method determination method of the L mode determination section 66 is the same as that of the L mode determination section 46 of the image predictive encoding device 10.

Figure 9:
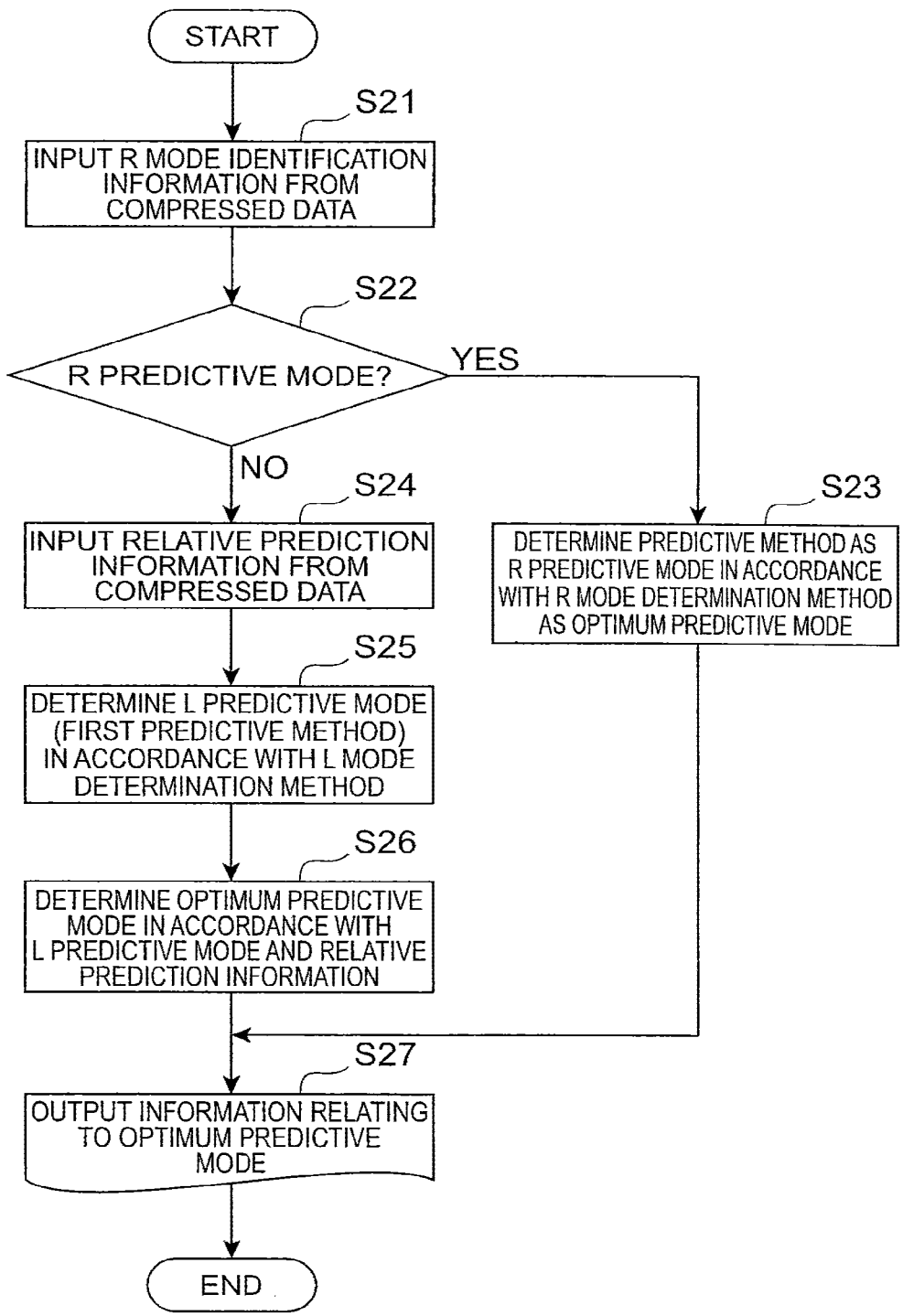
[FIG. 9] A flowchart which shows acquisition processing to acquire a predictive signal generation method of the predictive method acquisition section in FIG. 7.

The acquisition processing of the predictive signal generation method of the predictive method acquisition section 57 will be described next with reference to FIG. 9. First, R mode identification information extracted from the compressed image data are input from the data analysis section 51 to the predictive method acquisition section 57 (step S21). The switching switch 61 judges whether the information indicates R mode (step S22). In cases where the information indicates R mode (step S22; YES), the R mode determination section 64 determines the R mode predictive method in accordance with the R mode determination method and outputs the R mode predictive method to the predictive signal generation section 55 as the optimum predictive mode (step S23). However, in cases where the information does not indicate R mode (step S22; NO), relative prediction information extracted from the compressed image data are input to the mode information generation section 67 (step S24). Thereafter, the L mode determination section 66 determines the L mode predictive method in accordance with the L mode determination method (step S25). The mode information generation section 67 then determines the optimum predictive mode by adding the L mode predictive method-related mode information and relative prediction information (step S26). Thereafter, the mode information generation section 67 outputs the optimum predictive mode-related information thus determined to the predictive signal generation section 55 (step S27).

According to the image predictive decoding device 50 described hereinabove, the R mode and L mode predictive methods are derived for regenerated adjacent areas which are adjacent to the target area which is the decoding target by using data which have been processed in accordance with the adjacent areas and the optimum predictive method for the target area is derived on the basis of the R mode and L mode predictive methods and the relative predictive method, whereby an intra frame predictive signal is generated and this intra frame predictive signal is used to restore the target area pixel signal from the regenerated residual signal obtained by restoring the target area residual signal. The predictive method derived for the adjacent areas by using data corresponding to the regenerated adjacent areas has a high probability of being close to the optimum predictive method of the target area. Hence, by using this predictive method to restore predictive method-related mode information of the target area, the bit amount for encoding of the mode information identifying the predictive method (relative predictive method) is reduced and the overall decoding efficiency improves.

In particular, in cases where the predictive method is determined on a predetermined evaluation standard by using three or more predictive method-related information items which a plurality of adjacent blocks adjacent to the target block each possess as per R mode, there is a high probability that the predictive method will be close to the original predictive method of the target area. Therefore, because this predictive method can be taken as the target area predictive method, there is no need to receive mode information for identifying the predictive method (information identifying nine modes shown in (b) of FIG. 14, for example). As a result, the transmission amount pertaining to the mode information can be reduced by means of simple processing.

Furthermore, in cases where the predictive method which was determined from the nine predictive methods for the areas adjacent to the target block is used as per L mode, there is a high correlation to the target block predictive method and the target block mode information can be more efficiently encoded on the basis of the predictive method. As a result, the effect of reducing the bit amount pertaining to the mode information increases. Furthermore, in cases where the areas adjacent to the target block are subjected to inter frame predictive encoding, even when the adjacent blocks do not have intra frame prediction information, information relating to a predictive method determined from a plurality of predictive methods for the areas adjacent to the target block or a predictive method which three or more of the adjacent blocks each possess is used to determine a predictive method on a predetermined evaluation standard. Then, the target area prediction information is encoded based on the determined predictive method. As a result, the predictive method-related information of the target block can be more efficiently encoded.

An image predictive encoding program and an image predictive decoding program which cause a computer to operate as the image predictive encoding device 10 and the image predictive decoding device 50 will be described hereinbelow.

Figure 12:
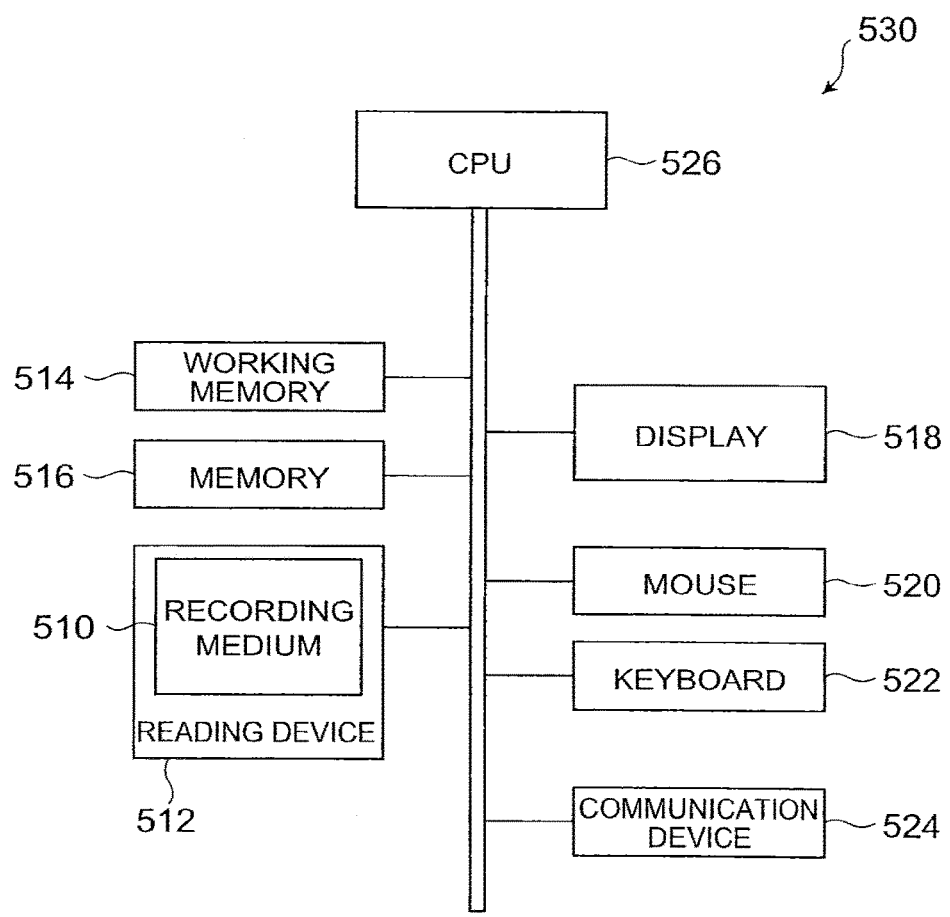
[FIG. 12] A diagram which shows the hardware constitution of a computer for executing the image predictive encoding program and the image predictive decoding program according to the embodiment of the present invention.
Figure 13:
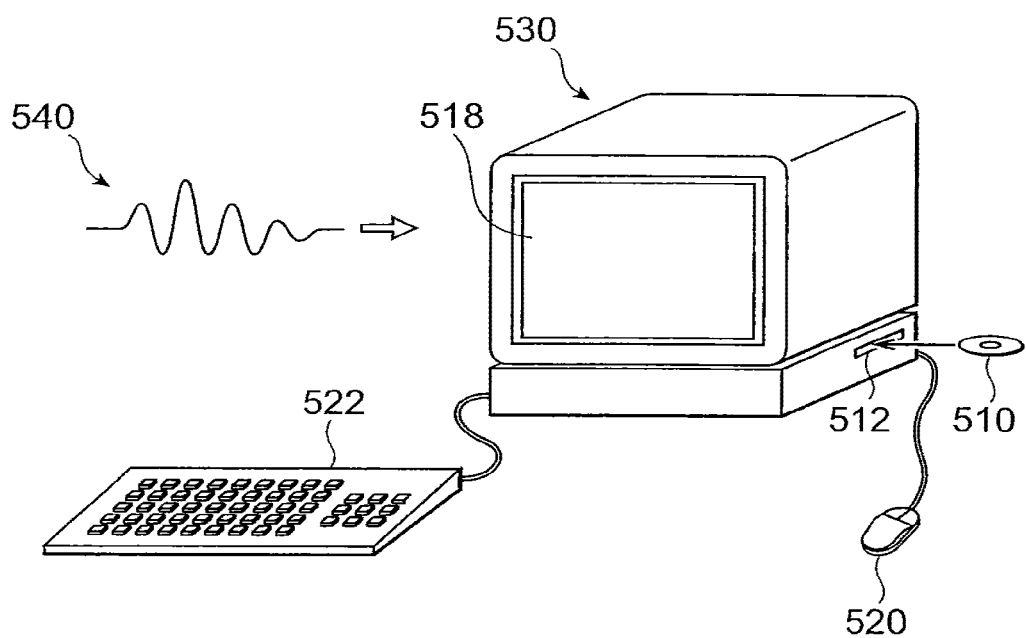
[FIG. 13] A perspective view of the computer in FIG. 12.

FIG. 12 shows the hardware constitution of a computer for executing the image predictive encoding program and image predictive decoding program which are recorded on a recording medium and FIG. 13 is a perspective view of the computer for executing the image predictive encoding program and the image predictive decoding program stored on the recording medium. The computer shown in FIGS. 12 and 13 is not limited to a computer with a narrow definition such as a personal computer and includes DVD players, set-top boxes, cellular phones, and so forth which comprise a CPU and perform processing and control and so forth by means of software. A computer 530 comprises a reading device 512 such as a floppy disk drive device, a CD-ROM drive device, or a DVD drive device, a working memory (RAM) 514 where the operating system resides, a memory 516 for storing the programs stored on a recording medium 510, a display device 518 such as a display, a mouse 520 and a keyboard 522 which are input devices, a communication device 524 for sending and receiving data and so forth, and a CPU 526 for controlling the execution of the programs. When the recording medium 510 is inserted into the reading device 512, the computer 530 is able to access the image predictive encoding program and the image predictive decoding program which are stored in the recording medium 510 via the reading device 512 and, as a result of the image predictive encoding program, is able to operate as the image predictive encoding device 10 of the present invention and, as a result of the image predictive decoding program, as the image predictive decoding device 50 of the present invention.

The present invention is not limited to the above embodiments. For example, the image predictive encoding device 10 may switch in block units between R mode and L mode or the switching may be performed with image units or sequence units as the switching units. In addition, either R mode or L mode may be employed without performing switching. In addition, the R mode determination section 43 and the L mode determination section 46 in FIG. 2 may also change places or the R mode determination section 43 and the L mode determination section 46 may be placed in the same R mode or L mode.

Moreover, although the image predictive decoding device 50 switches in block units between R mode and L mode, switching may also be performed with image units or sequence units as the switching units. In addition, either R mode or L mode may also be used without performing switching. In this case, because there is no R mode identification information, either of the functional blocks enclosed by the broken lines in FIG. 8 may be employed. In addition, the R mode determination section 64 and L mode determination section 66 in FIG. 8 may also change places or the R mode determination section 64 and L mode determination section 66 may also be placed in the same R mode or L mode.

Figure 10:
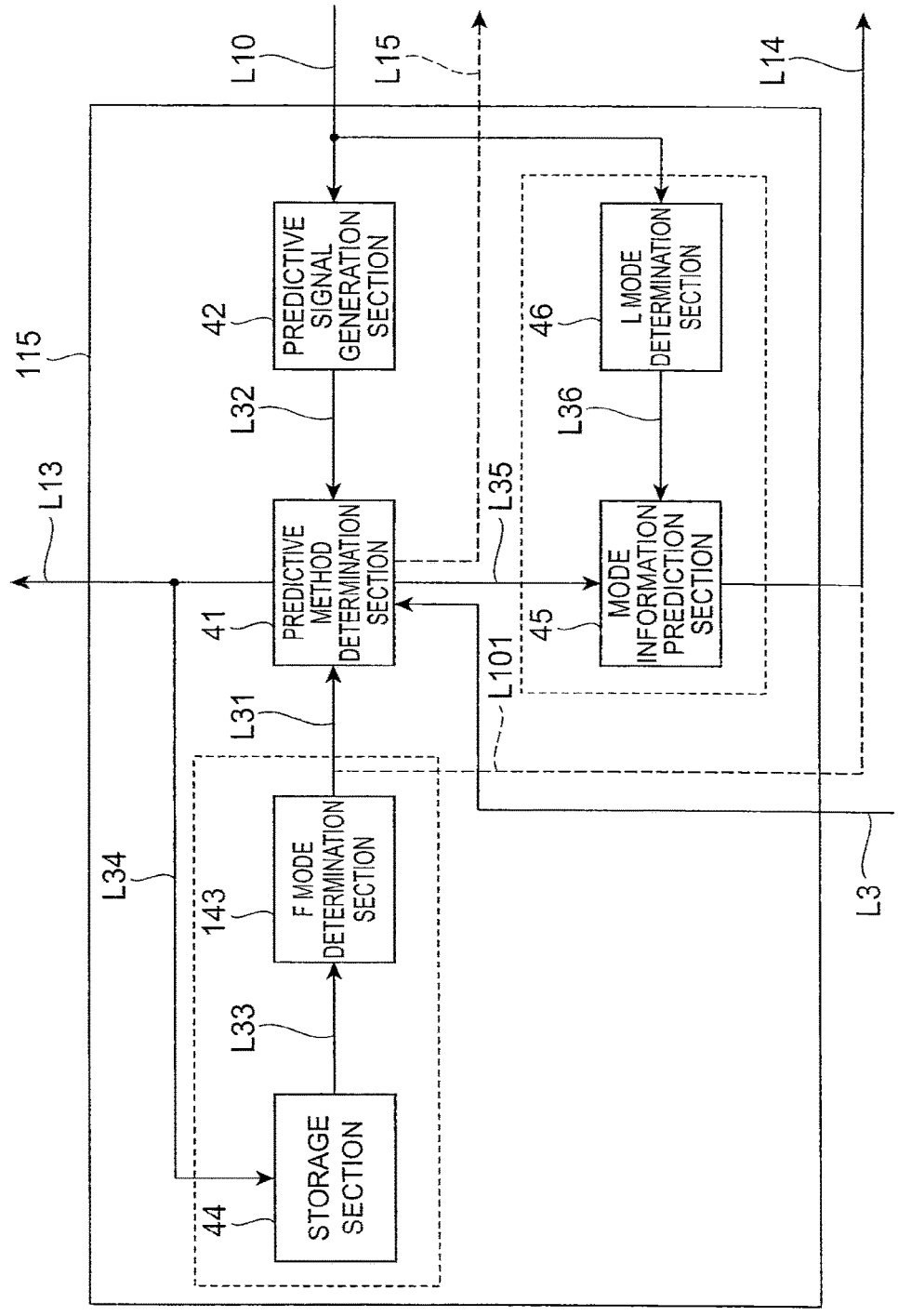
[FIG. 10] A block diagram which shows a modified example of an intra frame predictive signal generation method determination section in FIG. 2.
Figure 11:
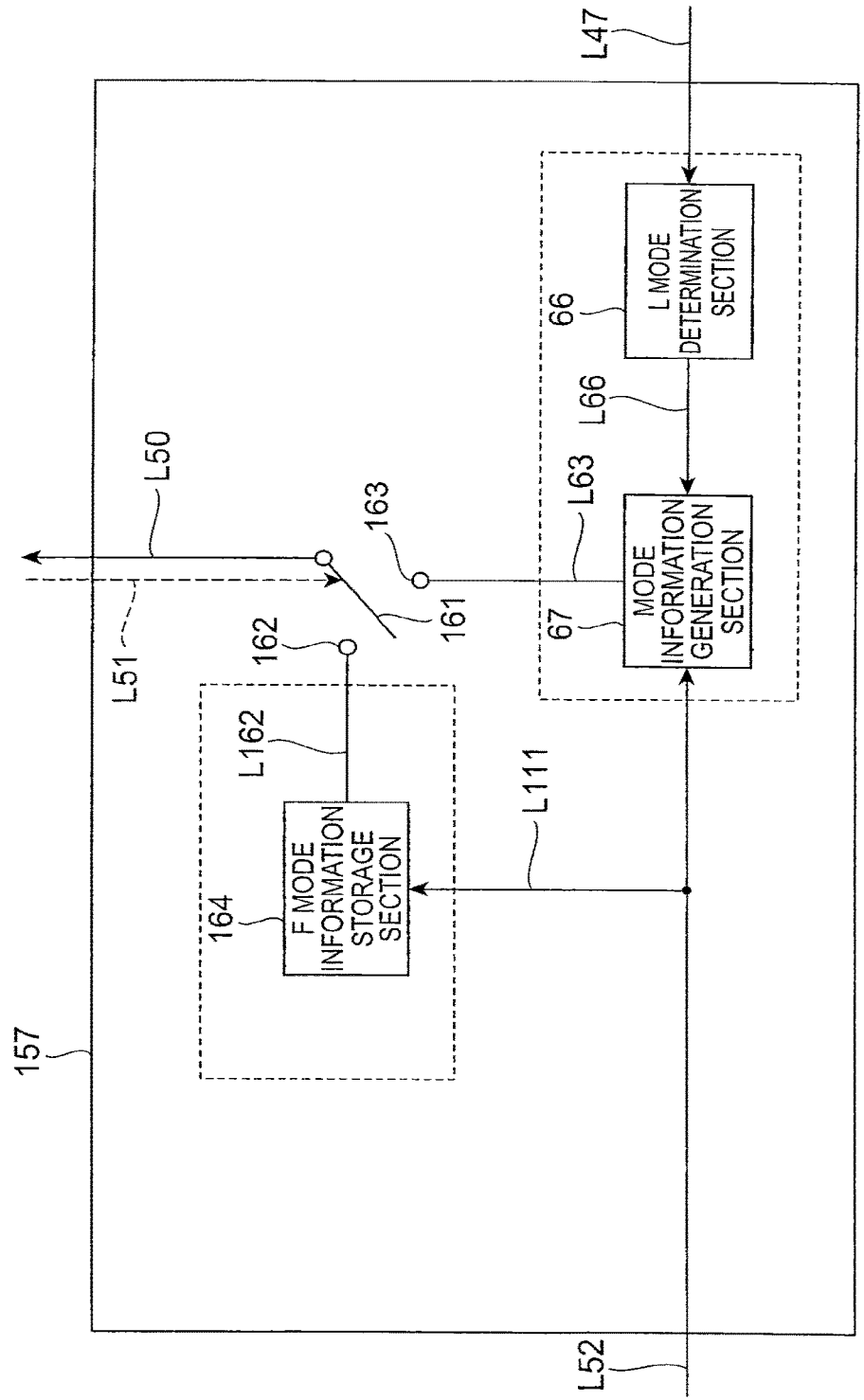
[FIG. 11] A block diagram which shows a modified example of the predictive method acquisition section in FIG. 8.

In addition, an intra frame predictive signal generation method determination section 115 which is shown in FIG. 10 may be used in place of the intra frame predictive signal generation method determination section 15 shown in FIG. 2 and a predictive method acquisition section 157 shown in FIG. 11 may also be used in place of the predictive method acquisition section 57 which is shown in FIG. 8.

The difference of the intra frame predictive signal generation method determination section 115 shown in FIG. 10 from the intra frame predictive signal generation method determination section 15 entails the provision of an F mode determination section 143 in place of the R mode determination section 43. The F mode determination section 143 determines the predictive method which arises the most frequently for the whole frame. More specifically, after storing predictive method-related information for each block in the storage section 44 via line L34, the predictive methods of the respective blocks are read from the storage section 44, the majority of the predictive methods among the predictive methods are derived, and the F mode predictive method is established. Here, the predictive mode stored in the storage section 44 may also be prediction information relating to a temporally preceding image or may be a predictive mode relating to the image of the current processing target. The F mode determination section 143 sends information relating to the F mode predictive method thus determined to the predictive method determination section 41 via line L31.

The difference of the predictive method acquisition section 157 shown in FIG. 11 from the predictive method acquisition section 57 entails the provision of an F mode information storage section 164 in place of the R mode determination section 64 and storage section 65. The F mode information storage section 164 receives an input of F mode predictive method-related information via a line L111 and stores this information. A switching switch 161 switches the connection between terminal 163 on the mode information generation section 67, terminal 162 on the F mode information storage section 164, and the predictive signal generation section 55 by means of a control signal via line L51. F mode information storage section 164 outputs F mode predictive method-related information to the predictive signal generation section 55 via line L50.

INDUSTRIAL APPLICABILITY

The present invention makes practical use of an image prediction encoding device, an image prediction decoding device, an image prediction encoding method, an image prediction decoding method, an image prediction encoding program, and an image prediction decoding program and permits efficient encoding processing or decoding processing by reducing the predictive method-related mode information for generating an intra frame predictive signal in a pixel domain.

The invention claimed is:

1. An image prediction encoding device which divides an image into a plurality of areas, generates an intra frame predictive signal with respect to a pixel signal contained in a target area which is a processing target among the areas, and encodes a residual signal between the pixel signal of the target area and the intra frame predictive signal, the image prediction encoding device comprising:
circuitry configured to:
derive a first mode information by processing a function including adding or subtracting of an integer to or from a second mode information relating to an intra frame predictive method corresponding to adjacent areas comprising regenerated pixel signals and adjacent to the target area, and determine a predictive method for generating the intra frame predictive signal based on the derived first mode information;
generate the intra frame predictive signal on the basis of the predictive method; and
encode a residual signal of the pixel signal of the target area on the basis of the intra frame predictive signal.

2. The image prediction encoding device according to claim 1, wherein the circuitry is configured to
generate a plurality of predictive signals for the adjacent areas corresponding to a predetermined plurality of predictive methods, and
determine a first predictive method from among the plurality of predictive methods in accordance with a predetermined evaluation standard.

3. The image prediction encoding device according to claim 1, wherein the circuitry is configured to use three or more predictive methods which are previously determined according to the adjacent areas to determine the predictive method for the adjacent areas in accordance with a predetermined evaluation standard.

4. An image prediction encoding device which divides an image into a plurality of areas, generates an intra frame predictive signal with respect to a pixel signal contained in a target area which is a processing target among the areas, and encodes a residual signal between the pixel signal of the target area and the intra frame predictive signal, the image prediction encoding device comprising:
circuitry configured to:
derive a first mode information by processing a function including adding or subtracting of an integer to or from a second mode information relating to an intra frame predictive method corresponding to adjacent areas comprising regenerated pixel signals and adjacent to the target area, and determine a first predictive method for generating the intra frame predictive signal based on the derived first mode information;
generate a plurality of predictive signals corresponding to a predetermined plurality of predictive methods for the target area and determine a second predictive method which is suitable for the target area from among the plurality of predictive methods in accordance with a predetermined evaluation standard;
generate the intra frame predictive signal on the basis of the second predictive method;
relatively encode the second predictive method on the basis of the first predictive method; and
encode a residual signal of the pixel signal of the target area on the basis of the intra frame predictive signal.

5. An image prediction decoding device which divides an image into a plurality of areas, generates an intra frame predictive signal with respect to a pixel signal contained in a target area which is a processing target among the areas, and restores the pixel signal of the target area by combining a residual signal relating to the target area contained in compressed image data and the intra frame predictive signal, the image prediction decoding device comprising:
circuitry configured to:
derive a first mode information by processing a function including adding or subtracting of an integer to or from a second mode information relating to an intra frame predictive method corresponding to adjacent areas comprising regenerated pixel signals and adjacent to the target area, and determine a predictive method for generating the intra frame predictive signal based on the derived first mode information;
generate the intra frame predictive signal on the basis of the predictive method;
extract a residual signal relating to the target area from the compressed image data to restore a regenerated residual signal, and
restore the pixel signal of the target area by combining the intra frame predictive signal and the regenerated residual signal.

6. The image prediction decoding device according to claim 5, wherein the circuitry is configured to
generate a plurality of predictive signals for the adjacent areas corresponding to a predetermined plurality of predictive methods, and
determine a first predictive method from among the plurality of predictive methods in accordance with a predetermined evaluation standard.

7. The image prediction decoding device according to claim 5, wherein the circuitry is configured to use three or more predictive methods which are previously determined according to the adjacent areas to determine the predictive method for the adjacent areas in accordance with a predetermined evaluation standard.

8. An image prediction decoding device which divides an image into a plurality of areas, generates an intra frame predictive signal with respect to a pixel signal contained in a target area which is a processing target among the areas, and restores the pixel signal of the target area by combining a residual signal relating to the target area contained in compressed image data and the intra frame predictive signal, the image prediction decoding device comprising:
circuitry configured to:
derive a first mode information by processing a function including adding or subtracting of an integer to or from a second mode information relating to an intra frame predictive method corresponding to adjacent areas comprising regenerated pixel signals and adjacent to the target area, and determine a first predictive method for generating the intra frame predictive signal based on the derived first mode information;
extract a relative predictive method which is relative information identifying a predictive method relating to the target area from the compressed image data and derives a second predictive method for the target area on the basis of the first predictive method and the relative predictive method;
generate the intra frame predictive signal on the basis of the second predictive method;
extract a residual signal relating to the target area from the compressed image data to restore a regenerated residual signal; and
restore the pixel signal of the target area by combining the intra frame predictive signal and the regenerated residual signal.

9. An image prediction encoding method which divides an image into a plurality of areas, generates an intra frame predictive signal with respect to a pixel signal contained in a target area which is a processing target among the areas, and encodes a residual signal between the pixel signal of the target area and the intra frame predictive signal, the image prediction encoding method comprising:
deriving, using circuitry, a first mode information by processing a function including adding or subtracting of an integer to or from a second mode information relating to an intra frame predictive method corresponding to adjacent areas comprising regenerated pixel signals and adjacent to the target area, and determining a predictive method for generating the intra frame predictive signal based on the derived first mode information;
generating the intra frame predictive signal on the basis of the predictive method; and
encoding a residual signal of the pixel signal of the target area on the basis of the intra frame predictive signal.

10. An image prediction encoding method which divides an image into a plurality of areas, generates an intra frame predictive signal with respect to a pixel signal contained in a target area which is a processing target among the areas, and encodes a residual signal between the pixel signal of the target area and the intra frame predictive signal, the image prediction encoding method comprising:
deriving, using circuitry, a first mode information by processing a function including adding or subtracting of an integer to or from a second mode information relating to an intra frame predictive method corresponding to adjacent areas comprising regenerated pixel signals and adjacent to the target area, and determining a first predictive method for generating the intra frame predictive signal based on the derived first mode information;
generating a plurality of predictive signals corresponding to a predetermined plurality of predictive methods for the target area and determining a second predictive method which is suitable for the target area from among the plurality of predictive methods in accordance with a predetermined evaluation standard;
generating the intra frame predictive signal on the basis of the second predictive method;
relatively encoding the second predictive method on the basis of the first predictive method; and
encoding a residual signal of the pixel signal of the target area on the basis of the intra frame predictive signal.

11. An image prediction decoding method which divides an image into a plurality of areas, generates an intra frame predictive signal with respect to a pixel signal contained in a target area which is a processing target among the areas, and restores the pixel signal of the target area by combining a residual signal relating to the target area contained in compressed image data and the intra frame predictive signal, the image prediction decoding method comprising:
deriving, using circuitry, a first mode information by processing a function including adding or subtracting of an integer to or from a second mode information relating to an intra frame predictive method corresponding to adjacent areas comprising regenerated pixel signals and adjacent to the target area, and determining a predictive method for generating the intra frame predictive signal based on the derived first mode information;
generating the intra frame predictive signal on the basis of the predictive method;

extracting a residual signal relating to the target area from the compressed image data to restore a regenerated residual signal; and restoring the pixel signal of the target area by combining the intra frame predictive signal and the regenerated residual signal.

12. An image prediction decoding method which divides an image into a plurality of areas, generates an intra frame predictive signal with respect to a pixel signal contained in a target area which is a processing target among the areas, and restores the pixel signal of the target area by combining a residual signal relating to the target area contained in compressed image data and the intra frame predictive signal, the image prediction decoding method comprising:

deriving, using circuitry, a first mode information by processing a function including adding or subtracting of an integer to or from a second mode information relating to an intra frame predictive method corresponding to adjacent areas comprising regenerated pixel signals and adjacent to the target area, and determining a first predictive method for generating the intra frame predictive signal based on the derived first mode information;

extracting a relative predictive method which is relative information identifying a predictive method relating to the target area from the compressed image data and deriving a second predictive method for the target area on the basis of the first predictive method and the relative predictive method;

generating the intra frame predictive signal on the basis of the second predictive method;

extracting a residual signal relating to the target area from the compressed image data to restore a regenerated residual signal; and restoring the pixel signal of the target area by combining the intra frame predictive signal and the regenerated residual signal.

13. A non-transitory computer-readable storage medium including computer-readable instructions that, when executed computer, cause the computer to execute an image prediction encoding method which divides an image into a plurality of areas, generates an intra frame predictive signal with respect to a pixel signal contained in a target area which is a processing target among the areas, and encodes a residual signal between the pixel signal of the target area and the intra frame predictive signal, the image prediction encoding method comprising:

deriving a first mode information by processing a function including adding or subtracting of an integer to or from a second mode information relating to an intra frame predictive method corresponding to the adjacent areas comprising regenerated pixel signals and adjacent to the target area, and determining a predictive method for generating the intra frame predictive signal based on the derived first mode information;

generating the intra frame predictive signal on the basis of the predictive method; and encoding a residual signal of the pixel signal of the target area on the basis of the intra frame predictive signal.

14. A non-transitory computer-readable storage medium including computer-readable instructions that, when executed computer, cause the computer to execute an image prediction encoding method which divides an image into a plurality of areas, generates an intra frame predictive signal with respect to a pixel signal contained in a target area which is a processing target among the areas, and encodes a residual signal between the pixel signal of the target area and the intra frame predictive signal, the image prediction encoding method comprising:

deriving a first mode information by processing a function including adding or subtracting of an integer to or from a second mode information relating to an intra frame predictive method corresponding to adjacent areas comprising regenerated pixel signals and adjacent to the target area, and determining a first predictive method for generating the intra frame predictive signal based on the derived first mode information;

generating a plurality of predictive signals corresponding to a predetermined plurality of predictive methods for the target area and determining a second predictive method which is suitable for the target area from among the plurality of predictive methods in accordance with a predetermined evaluation standard;

generating the intra frame predictive signal on the basis of the second predictive method;

relatively encoding the second predictive method on the basis of the first predictive method; and encoding a residual signal of the pixel signal of the target area on the basis of the intra frame predictive signal.

15. A non-transitory computer-readable storage medium including computer-readable instructions that, when executed computer, cause the computer to execute an image prediction decoding method which divides an image into a plurality of areas, generates an intra frame predictive signal with respect to a pixel signal contained in a target area which is a processing target among the areas, and restores the pixel signal of the target area by combining a residual signal relating to the target area contained in compressed image data and the intra frame predictive signal, the image prediction decoding method comprising:

deriving a first mode information by processing a function including adding or subtracting of an integer to or from a second mode information relating to an intra frame predictive method corresponding to adjacent areas comprising regenerated pixel signals and adjacent to the target area, and determining a predictive method for generating the intra frame predictive signal based on the derived first mode information;

generating the intra frame predictive signal on the basis of the predictive method;

extracting a residual signal relating to the target area from the compressed image data to restore a regenerated residual signal; and restoring the pixel signal of the target area by combining the intra frame predictive signal and the regenerated residual signal.

16. A non-transitory computer-readable storage medium including computer-readable instructions that, when executed computer, cause the computer to execute an image prediction decoding method which divides an image into a plurality of areas, generates an intra frame predictive signal with respect to a pixel signal contained in a target area which is a processing target among the areas, and restores the pixel signal of the target area by combining a residual signal relating to the target area contained in compressed image data and the intra frame predictive signal, the image prediction decoding method comprising:

deriving a first mode information by processing a function including adding or subtracting of an integer to or from a second mode information relating to an intra frame predictive method corresponding to adjacent areas comprising regenerated pixel signals and adjacent to the target area, and determining a first predictive method for generating the intra frame predictive signal based on the derived first mode information;

extracting a relative predictive method which is relative information identifying a predictive method relating to the target area from the compressed image data and deriving a second predictive method for the target area on the basis of the first predictive method and the relative predictive method;

generating the intra frame predictive signal on the basis of the second predictive method;

extracting a residual signal relating to the target area from the compressed image data to restore a regenerated residual signal; and restoring the pixel signal of the target area by combining the intra frame predictive signal and the regenerated residual signal.

* * * * *